United States Patent [19]
Takekoshi et al.

[11] Patent Number: 5,602,383
[45] Date of Patent: Feb. 11, 1997

[54] OPTICAL APPARATUS FOR OPTICALLY READING AND RECORDING INFORMATION

[75] Inventors: Taro Takekoshi; Masatoshi Yonekubo, both of Nagano-ken, Japan

[73] Assignee: Seiko Epson Corporation, Tokyo, Japan

[21] Appl. No.: 440,915

[22] Filed: May 15, 1995

[30] Foreign Application Priority Data

May 17, 1994 [JP] Japan ................................ 6-103036

[51] Int. Cl.$^6$ ..................... G02B 7/04; G02B 27/40; G11B 7/00
[52] U.S. Cl. .................... 250/201.5; 369/44.12; 369/112
[58] Field of Search ..................... 250/201.4, 201.5; 369/44.12, 44.23, 112

[56] References Cited

U.S. PATENT DOCUMENTS

| | | | |
|---|---|---|---|
| 5,313,441 | 5/1994 | Imai et al. | 369/44.12 |
| 5,402,407 | 3/1995 | Eguchi et al. | 369/44.23 |
| 5,422,870 | 6/1995 | Kojima et al. | 369/112 |
| 5,428,584 | 6/1995 | Yoshida et al. | 369/112 |
| 5,446,719 | 8/1995 | Yoshida et al. | 369/44.12 |
| 5,496,995 | 3/1996 | Kato et al. | 369/44.12 |

FOREIGN PATENT DOCUMENTS 63-229640  9/1988  Japan.

*Primary Examiner*—Stephone Allen
*Attorney, Agent, or Firm*—Oliff & Berridge

[57] ABSTRACT

An optical head for use in an optical recording apparatus contains a lens element that permits independent setting of the magnification and numerical aperture for a forward optical system and a rearward optical system. The optical head includes a light beam emitting assembly that emits a beam of light and a light beam separating assembly. A light beam focusing element focuses a forward light beam onto an optical recording medium. The light beam emitted from the light beam emitting assembly follows a forward optical path passing through the light beam separating assembly as a non-diffracted light beam and is focused onto the optical recording medium. A rearward light beam is reflected from the optical recording medium and follows a rearward optical path passing through the focusing element and the light beam separating assembly such that the rearward light beam is deflected to a light detection device. The lens element is positioned in at least one of the forward optical path and the rearward optical path.

44 Claims, 18 Drawing Sheets

OPTICAL APPARATUS FOR OPTICALLY READING AND RECORDING INFORMATION

BACKGROUND OF THE INVENTION

1. Field of the Invention

The present invention relates to an optical head and an optical recording apparatus provided with an optical head, particularly to an optical head including a semiconductor laser and a light detecting device located within a single housing, and having the capability of emitting a light beam with high enough light power required to record data on an optical recording medium.

2. Description of the Related Art

An integrated optical head including a semiconductor laser, a light detecting device, and a hologram element that separates a light beam accommodated in a single housing has been recently proposed. This has practical applications in compact disk (CD) reproduction systems. FIG. 17 illustrates an example of such an optical head. The optical head includes a semiconductor laser 10 and a light detecting device 70 disposed adjacent to each other, as shown in FIG. 17. A forward light beam 801f emitted from the semiconductor laser 10 passes through a hologram element 30 as a zero order light beam (i.e., non-diffracted beam). The beam is focused by an objective lens 50 into a spot 61 on the recording surface of an optical recording medium 60. The light beam is reflected from the optical recording medium 60 and travels as a backward light beam 801r through the objective lens 50. The backward light beam 801r is diffracted by the hologram element 30 and focused onto a light detecting device 70.

The arrangement depicted in FIG. 17 has a finite optical system with a focusing element including only an objective lens 50. In an infinite optical system, a collimator lens is disposed between the hologram element 30 and the objective lens 50 so that the light beam becomes a parallel beam between the collimator lens and the objective lens. In any case, the light beam travels through the same optical system in both forward and backward directions and thus the magnification (or reduction ratio) associated with the forward light beam is the same as the magnification associated with the backward light beam. Thus, the numerical aperture (NA) for the forward light beam 801f is the same as that for the backward light beam 801r. Magnification is defined as the absolute value of lateral magnification. The reference of the lateral magnification is the side of a light source for a forward optical path, and it is the side of a light detector for a rearward optical path.

In general, the magnification of the optical system should satisfy requirements regarding the detection sensitivity of a focusing error signal. To read information pits having a very small size formed on an optical recording medium 60, a beam spot 61 having a diameter of about 1 μm is necessary to accurately track the information pit on the recording surface of the optical recording medium 60. To satisfy this requirement, the focusing error should be less than ±1 μm taking into account a small focal depth.

The light detecting device 70 detects the focusing error and produces a focusing error signal. The focusing error is corrected by controlling the position of the objective lens 50 with a focusing servo control using the focusing error signal from the light detecting device. This, however, requires a high resolution (detection sensitivity) of the focusing error signal. When the light detecting device 70 and the semiconductor laser 10 are assembled, there is some inevitable positioning error between the optical axis of these elements. This positioning error between the optical axes results in an initial offset of the focusing error signal. The initial offset d can be written as $$d = D \times (\beta \times \beta) \div 2$$

where $\beta$ is the magnification of the optical system, and D is the above-described positioning error between the optical axes. When the positioning error along the optical axis D is assumed to be ±50 μm, then a magnification $\beta$ of ⅕ is necessary to have a small initial offset within an allowable range of the focusing error determined from the focal depth. In usual reproduction optical heads for use in CDs (compact disk systems), the magnification of the optical system is set to a value in the range from ¼ to ⅙ for the reason described above.

As described above, the light beam must be focused via the objective lens 50 into a spot 61 with a size as small as 1 μm. To meet this requirement, the NA (numerical aperture) of the objective lens 50 should be greater than 0.45 at its output side, provided that the semiconductor laser 10 emits a light beam having a wavelength $\lambda$ of 780 nm. However, if the $NA_0$ is set to a greater value, that is, if the brightness of the image obtained by the lens becomes higher, then the focal depth becomes smaller and thus higher accuracy is required in the focusing servo control system beyond a degree that can be achieved practically. Thus, if the $NA_0$ at the output side of the lens is set to 0.45, and the magnification of the optical system $\beta$ is set to ⅕, then the $NA_I$ at the input side becomes $0.45 \times \frac{1}{5} = 0.09$.

The semiconductor laser 10 emits a light beam having a far-field pattern in the form of Gaussian distribution in which the full width at half maximum in the direction parallel to the laser junction interface is about 10°, and the full width at half maximum in the direction perpendicular to that is about 25°. Only part of the light beam having such a distribution can actually reach and enter the inside of the aperture 51 of the objective lens 50. In FIG. 17, as small as 20% of the light beam enters the aperture 51 when the $NA_I$ at the input side of the objective lens 50 is 0.09 and the transmission loss of the hologram element 30 is assumed to be negligible.

On the other hand, the total light power of the plurality of backward light beams 801r detected by the light detecting device 70 should be at least 20 μW to achieve an acceptable signal-to-noise ratio associated with the detected signal. In the case of optical heads for use in reproduction of CDs (compact disks), a semiconductor laser 10 having a rather low capability in the rated output light power such as 5 mW is used to reduce cost.

An example of the design of an optical system regarding the distribution of light power is as follows:

Optical System Associated with the Backward Optical Path:

$$\alpha 1 = 20\%; R = 80\%$$

Light power Received by the light detecting device =

$$0.3 \text{ mW} \times 0.8 \times 0.2 \times 0.9 = 0.043 \text{ mW} (= 43 \mu W)$$

Optical System Associated with the Forward Optical Path:

$$\alpha 0 = 60\% (= 80\% - \alpha 1)$$

Maximum Output Light power Available via the Objective Lens =

$$5 \text{ mW} \times 0.2 \times 0.6 \times 0.9 = 0.54 \text{ mW} (> 0.3 \text{ mW})$$

where $\alpha 0$ is the zero order light efficiency of the hologram element, $\alpha 1$ is the first order light efficiency of the hologram element, and R is the reflectance of the optical recording medium. In the above example, it is assumed that the transmission loss of the optical system (due to for example the reflection at the surface of optical elements such as an objective lens) is 10%. Usually, the optical output light power available via the objective lens is about 0.3 mW. Since the hologram element also produces diffracted light of the second or higher order, the theoretical upper limit of the total efficiency including $\alpha 0$ and $\alpha 1$ is about 80%.

From the above equation, it can be seen that it is possible to design an optical system such that sufficient output light power can be obtained via an objective lens and thus a light detecting device can receive sufficient light power as long as the optical system is used in a read-only optical head. However, although it is possible to achieve satisfactory distribution of the light power for the read-only optical head, it is impossible to obtain consistent distribution of the light power of optical heads used to write information on an optical recording medium. The above difficulty occurs for the following reasons.

Various types of optical recording media having the capability of writing information are used in practical applications. These optical recording media are based for example on the magneto-optical technique, phase-change technique, or polymer-die technique. The write power, or the output light power available via an objective lens, required to write information on these media depends on the type of a recording medium used. In the case of a magneto-optical recording medium, 5 mW or greater write power is required. Unlike the read-only media, the reflectance of the writable optical recording medium decreases owing to the absorption of light by a recording layer. For example, the reflectance of a magneto-optical recording medium is as low as 16%. The read power, or the light power used in reading operations, should be as small as about 1 mW or a few tenths of the write power so as to prevent degradation in recorded information when reproduced repeatedly. If the above-described requirement is taken into account, an example of possible design regarding the light power distribution will be as follows.

Optical System Associated with the Backward Optical Path:

$\alpha 1 = 30\%; R = 80\%$

The Light power Received by the light detecting device =

$1 \text{ mW} \times 0.16 \times 0.3 \times 0.9 = 0.043 \text{ mW} (= 43 \mu W)$ Optical System Associated with the Forward Optical Path:

$\alpha 0 = 50\% (= 80\% - 30\%)$

Maximum Light power Available via the Objective Lens =

$P \times 0.20 \times 0.5 \times 0.9 > 5 \text{ mW}$

Thus, $P > 55 \text{ mW}$

In the above design example, it is assumed that the light detecting device receives the same light power as in the case of the read-only optical head described above. Furthermore, it is also assumed that the optical system has the same magnification $\beta$ and the same coupling efficiency $\eta$ as in the case of the read-only optical head. From the above discussion, it can be concluded that the semiconductor laser used should have the capability of outputting very high light power such as 55 mW or greater. However, semiconductor lasers having such a high capability are not commercially available. Even if such a semiconductor laser becomes available in the future, it will be very expensive.

An attempt to solve the above problem is to employ an arrangement shown in FIG. 18, which is referred to as a second conventional optical head. An optical head is used in a writable optical recording apparatus instead of using an integrated-type optical head such as that described in FIG. 17. In this arrangement, a beam splitter 90 is used to separate the light beam separation means so that a semiconductor laser 91 and a light detecting device 97 can be located apart from each other. Thus, the optical system associated with the forward optical path and the optical system associated with the backward optical path are formed separately. In this arrangement, the magnifications associated with the forward and backward optical systems can be set independently of each other. In this arrangement, the magnification of the optical system associated with the forward optical path is given by the ratio of the focal length of a collimator lens 92 to that of an objective lens 95. This can be determined independently of the magnification of the backward optical system. When the magnification of the forward optical system is set to about ⅓, the NA associated with the forward light beam is 0.45/3=0.15, and thus the coupling efficiency $\eta$ increases to about 45%. Thus Maximum Optical Output Power Available via the Objective Lens =

$P \times 0.45 \times 0.5 \times 0.9 > 5 \text{ mW}$ and thus, $P > 25 \text{ mW}$.

This power level permits the use of a commercially available semiconductor laser having the capability of outputting light power of 30 mW.

However, in the second conventional optical head described above, expensive optical elements such as a beam splitter are required. Furthermore, the forward and backward optical systems need separate installation spaces. As a result, it is very difficult to reduce the size of the optical head. This makes it difficult to reduce the size and cost of an optical recording apparatus and also makes it difficult to increase its operation speed.

SUMMARY OF THE INVENTION

It is an object of the present invention to provide a small integrated optical head in which the magnifications associated with the forward and backward optical paths can be independently set. As a result, the coupling efficiency $\eta$ associated with the forward light path can be greatly improved without exerting adverse effects on the magnification of the backward optical path thereby making it possible to employ a semiconductor laser that is commercially available at a low cost. This arrangement reduces the size, weight, and cost of an optical recording apparatus. To achieve the above objects, the present invention provides an optical head and optical recording apparatus according to various aspects described below.

The optical head according to embodiments of the present invention includes a light beam emitting assembly that emits a beam of light, a light beam separating assembly, a light beam focusing element that focuses the beam of light onto an optical recording medium and a light detection device. The light beam emitted from the light beam emitting assembly follows a forward path in a forward optical system. The light beam passes through the light beam separating assembly as a non-diffracted light beam and is focused onto the optical recording medium by the focusing element. A rearward light beam is reflected from the optical recording medium and follows a rearward path in a rearward optical system. The rearward light beam passes through the focusing element and the light beam separating assembly. The rearward light beam is deflected by the light beam separating assembly toward the light detection device. The optical head includes a lens element positioned in at least one of the forward optical system and the rearward optical system. The lens element may be used to produce positive refractive power or negative refractory power. When the lens element is to provide positive refractory power it is disposed within the path of the forward optical system. Similarly, when negative refractory power is desired, the lens element is disposed within the path of the rearward optical system. The use of the lens element permits independent setting of the magnifications and numerical apertures for the forward optical system and the rearward optical system.

When the lens element is disposed within the forward optical path, the magnification of the optical system associated with the forward optical path is greater than the magnification of the optical system associated with the backward optical path and thus increasing the coupling efficiency of the optical system associated with the forward optical path. For example, the magnification of the optical system associated with the forward optical path is greater than ¼ and the magnification of the optical system associated with the backward optical path is less than ¼. With this arrangement, a sufficiently high detection sensitivity associated with the focusing error signal can be achieved while maintaining a sufficiently high coupling efficiency required for use in a writable optical head.

The numerical aperture associated with the light beam emitted by the semiconductor laser that is accepted by the focusing element (i.e., an effective light beam) is greater than 0.12. This produces a coupling efficiency as high as 32%.

The lens element includes a lens surface. The lens surface may contain a spherical surface, aspheric surface, cylindrical surface, anamorphic surface, grating lens, Fresnel lens, or the like. The use of the lens surface expands the degree of freedom in the design of the optical system. It is possible to realize directivity in the refracting power, and therefore correct an asymmetric distribution of the intensity of light emitted by the semiconductor laser thereby further improving the coupling efficiency.

Additionally, the lens element may be formed as part of a transparent cover that seal an opening in a housing containing the light detecting device and the light emitting assembly. With such an arrangement, the lens part is integrated with the cover. Thus, there is no need to use an additional elements. This simplifies the structure of the optical head.

The light separating assembly deflects the light beam in the rearward optical system towards the light detection assembly. The separating assembly may contain a hologram element or a beam splitter.

Additionally, a polarizing element may be fixed to or integrated with the transparent cover. The backward light beam reflected from a magneto-optical recording medium passes through the polarizing element. This arrangement makes it possible to improve the coupling efficiency associated with the forward optical system thereby obtaining a high enough optical output power (write power) required to write information on a magneto-optical recording medium. This arrangement also provides a simple structure for detecting a magneto-optical signal.

The optical head according to any of the above-described aspects of the invention can provide a high coupling efficiency associated with the forward optical system with a simple structure having a small size. Therefore, any of these optical heads can be used to realize a small optical recording apparatus having the capability of writing information on an optical recording medium.

BRIEF DESCRIPTION OF THE DRAWINGS

This invention will be described in detail with reference to the following drawings in which like reference numerals refer to like elements and wherein.

DESCRIPTION OF THE PREFERRED EMBODIMENTS

Figure 1:
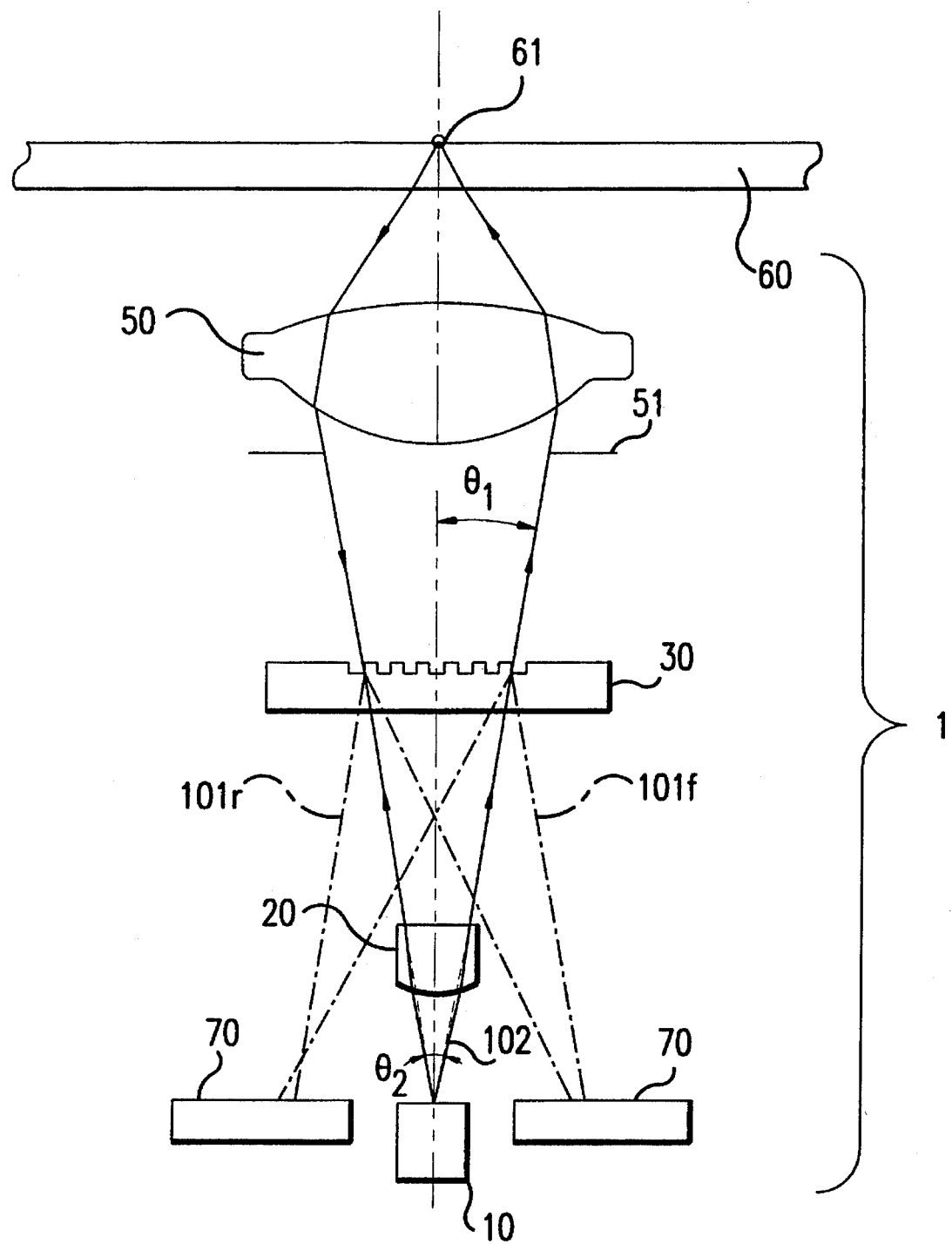
FIG. 1 is a schematic view illustrating an optical head according to an embodiment of the present invention.

FIG. 1 illustrates an optical system for an optical head according to an embodiment of the present invention. As shown in FIG. 1, the optical head 1 has a semiconductor laser 10 acting as a light emitting device. A hologram element 30 contains curved grooves which act as a diffraction grating. The optical head 1 further includes an objective lens 50 and a light detecting device 70 comprising a multisegment photodiode. The light source and the detecting optical system in the optical head are integral. The objectto-image distance (i.e., total track) associated with the objective lens 50 may be as small as 15 mm. This arrangement produces a compact and finite optical system. In FIG. 1, an optical recording medium 60 (such as, for example, a disk) has a recording surface containing track grooves (not shown) formed at small pitches. Information pits are formed along the track grooves.

A forward light beam 101*f* is emitted from the semiconductor laser 10. The beam 101*f* passes through the hologram element 30 as a zero order light beam (i.e., non-diffracted beam). The forward light beam 101*f* is then focused by the objective lens 50 into a spot 61 on the recording surface of the optical recording medium 60. The light reflected from the optical recording medium 60 passes again through the objective lens 50 and is then diffracted by the hologram element 30. The backward light beam 101*r* is focused onto the light detecting device 70. The specifications of the objective lens 50 essentially determine the characteristics and features of the optical system of the present embodiment. Preferable Magnification $\beta = 1/5$;

$NA_O$ (numerical aperture) at the output side of the lens = 0.5

$NA_I$ (numerical aperture) at the input side of the lens = 0.1 (= 0.5 × 1/5)

In the above specifications, the magnification $\beta$ is set to a value that gives an acceptable sensitivity in detecting the focusing error in the forward optical system. The diameter of aperture 51 determines the numerical aperture NA.

Figure 3:
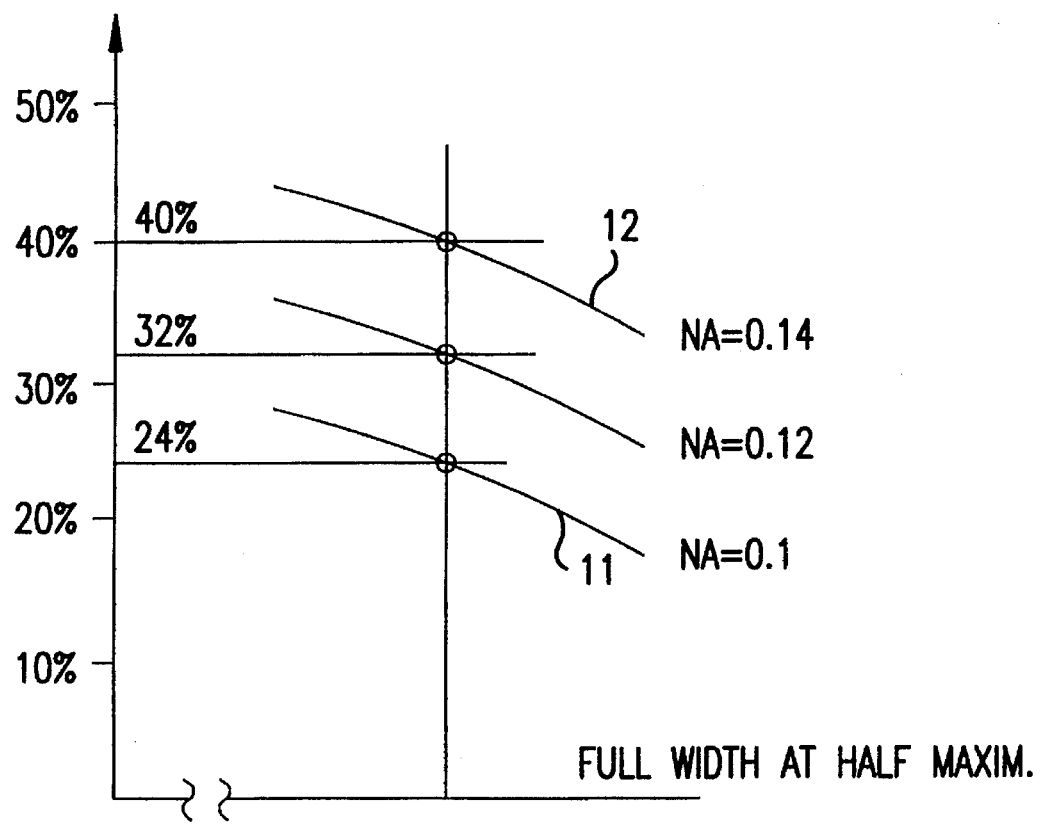
FIG. 3 is a graph illustrating the coupling efficiency $\eta$ of the embodiment shown in FIG. 1.
Figure 17:
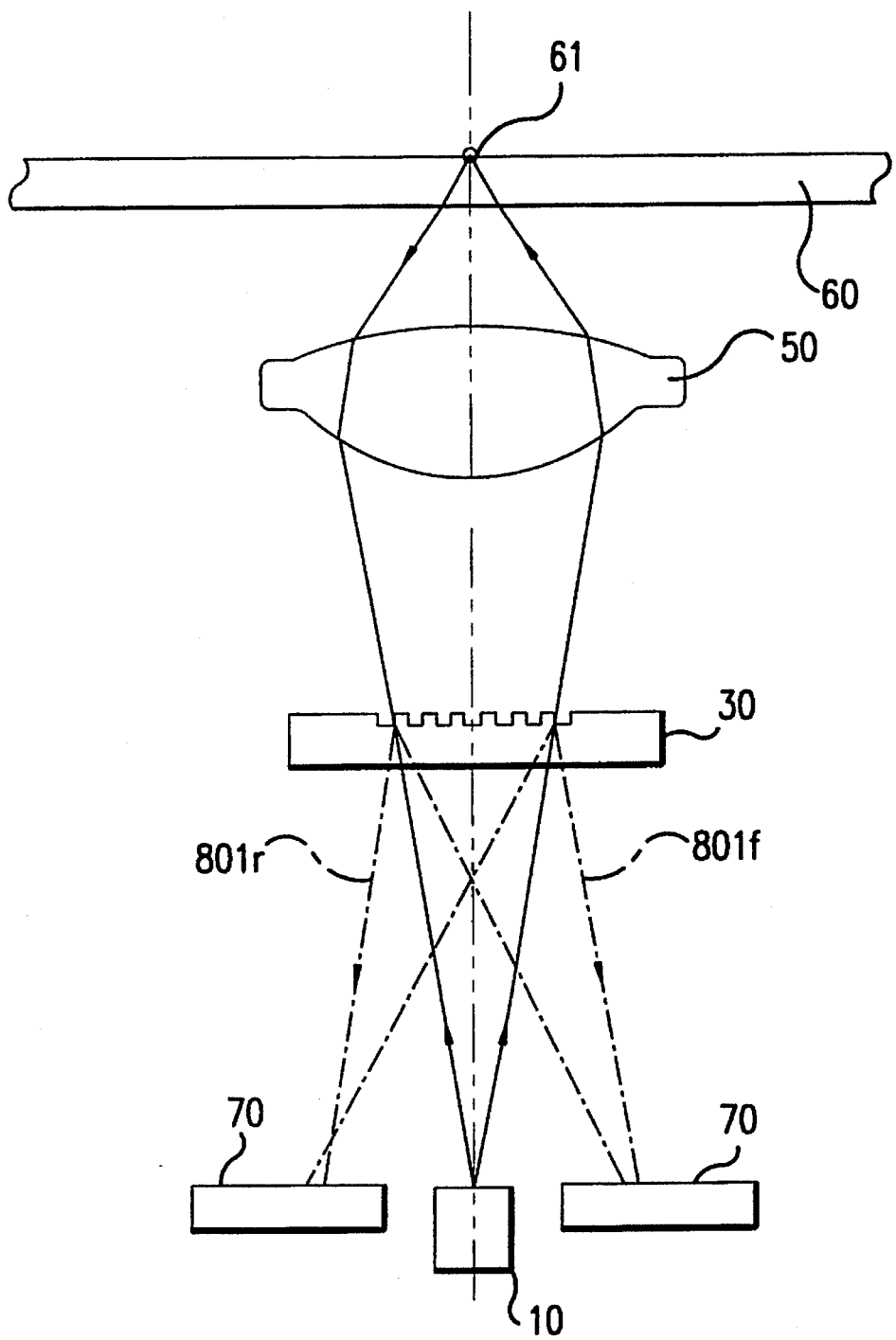
FIG. 17 is a schematic view illustrating a conventional optical head.

FIG. 3 illustrates the coupling efficiency $\eta$ of the forward optical system of the optical head 1. The horizontal axis indicates the full width at half maximum. This is a measure of the convergence of a light beam having Gaussian distribution emitted by a semiconductor laser. When only the objective lens having the above-described specifications is used, $NA_I$ at the input side is too small to obtain an acceptable coupling efficiency. Thus, in this case, as represented by a curve 11 in FIG. 3, the coupling efficiency $\eta$ would be as small as 24% for a light beam having a typical distribution pattern (having a full angle at half maximum of 10° in the direction parallel to the laser junction interface and 25° in the direction perpendicular to that). Using the above-described objective lens in an optical system of an optical head for generating write power (the optical output power available via the objective lens) greater than 5 mW, a consistent distribution of light power would not be achieved unless a very high power semiconductor laser is used, as discussed earlier referring to the conventional arrangements (as shown, for example, in FIG. 17).

Figure 2:
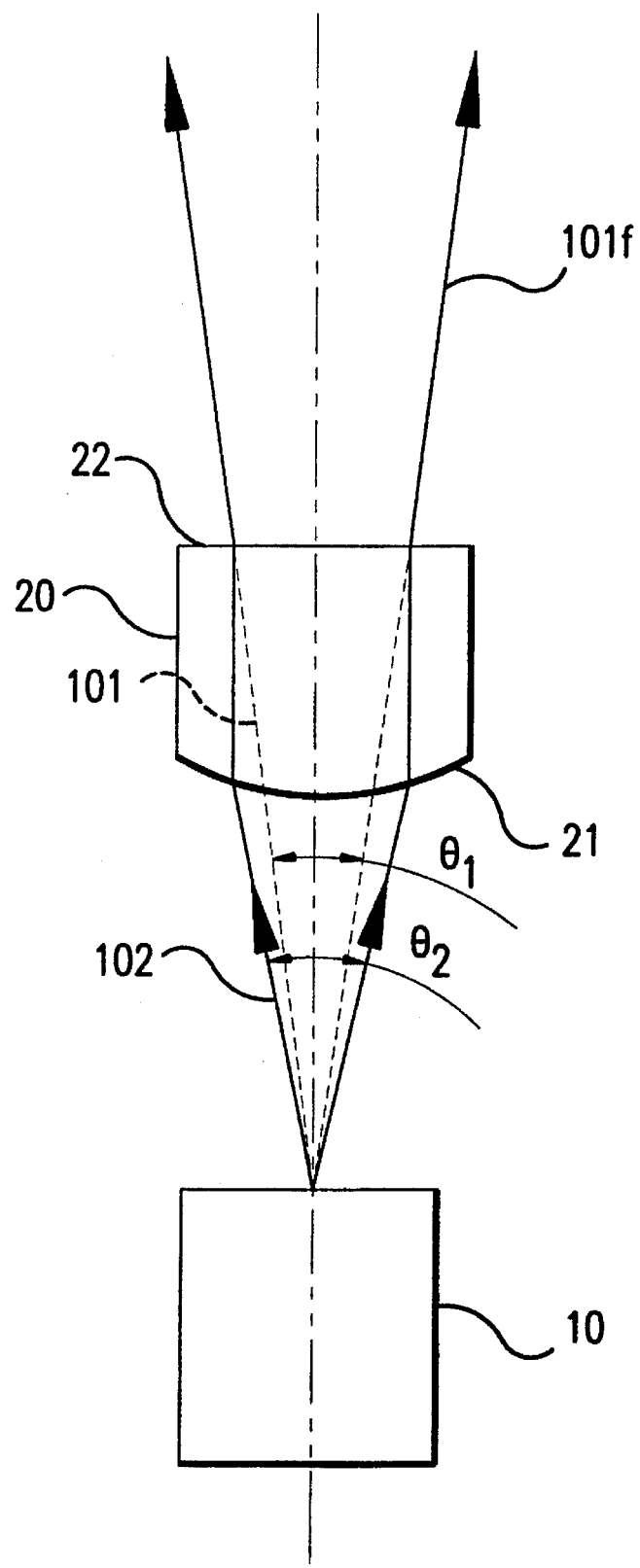
FIG. 2 is an enlarged schematic diagram illustrating the convex lens of FIG. 1.

To address this problem regarding the light power distribution, an embodiment of the present invention includes a small convex lens 20 positioned between the semiconductor laser 10 and the hologram element 30, as shown in FIG. 1. The convex lens 20 has positive refracting power. The input plane 21 of the convex lens 20 has a spherical surface with radius R2, as shown in FIG. 2. The output plane 22 of the lens 20 is flat. Alternatively, the input plane 21 may also have an aspheric surface for aberration correction. Furthermore, the lens 20 may also be formed as a meniscus lens having a convex input plane and a concave output plane. In the present embodiment, however, an plano-convex lens having a simple spherical surface is inexpensive and preferable. A very strong refracting power is not required in this case and the aberration produced by the simple spherical surface does not produce a problem in practical applications.

When the convex lens 20 is not used, the light beam that can enter through aperture of the objective lens will be represented by path 101 in FIG. 2. By contrast, when the convex lens 20 is positioned between the objective lens 50 and the semiconductor laser 10, the light beam following path 102 can enter the aperture of the objective lens. In this case, since the light beam is diffracted by the convex lens 20, the effective aperture angle $\theta 2$ for the light beam 102 is greater than the aperture angle $\theta 1$ for the light beam 101. As described above, when only the objective lens 50 is used without the convex lens 20, the $NA_I$ at its input side is 0.1. Since the $NA_I$ is defined as $NA_I = \sin\theta$, thus $\theta 1 = \arcsin 0.1 = 5.7°$. In contrast, when the convex lens 20 is used according to the present embodiment, $\theta 2$ increases up to 8.0°. Correspondingly, the $NA_I$ also increases to 0.14 (= sin 8°).

In FIG. 3, curve 12 represents the coupling efficiency $\eta$ when $NA_I$ is increased by the convex lens 20 according to the present embodiment. As can be seen from FIG. 3, the coupling efficiency $\eta$ increases up to 40%. From the discussion given above referring to the second conventional optical head, the high coupling efficiency in the arrangement according to the present embodiment can provide write power of 5 mW using a 30-mW semiconductor laser as a light source.

Figure 4:
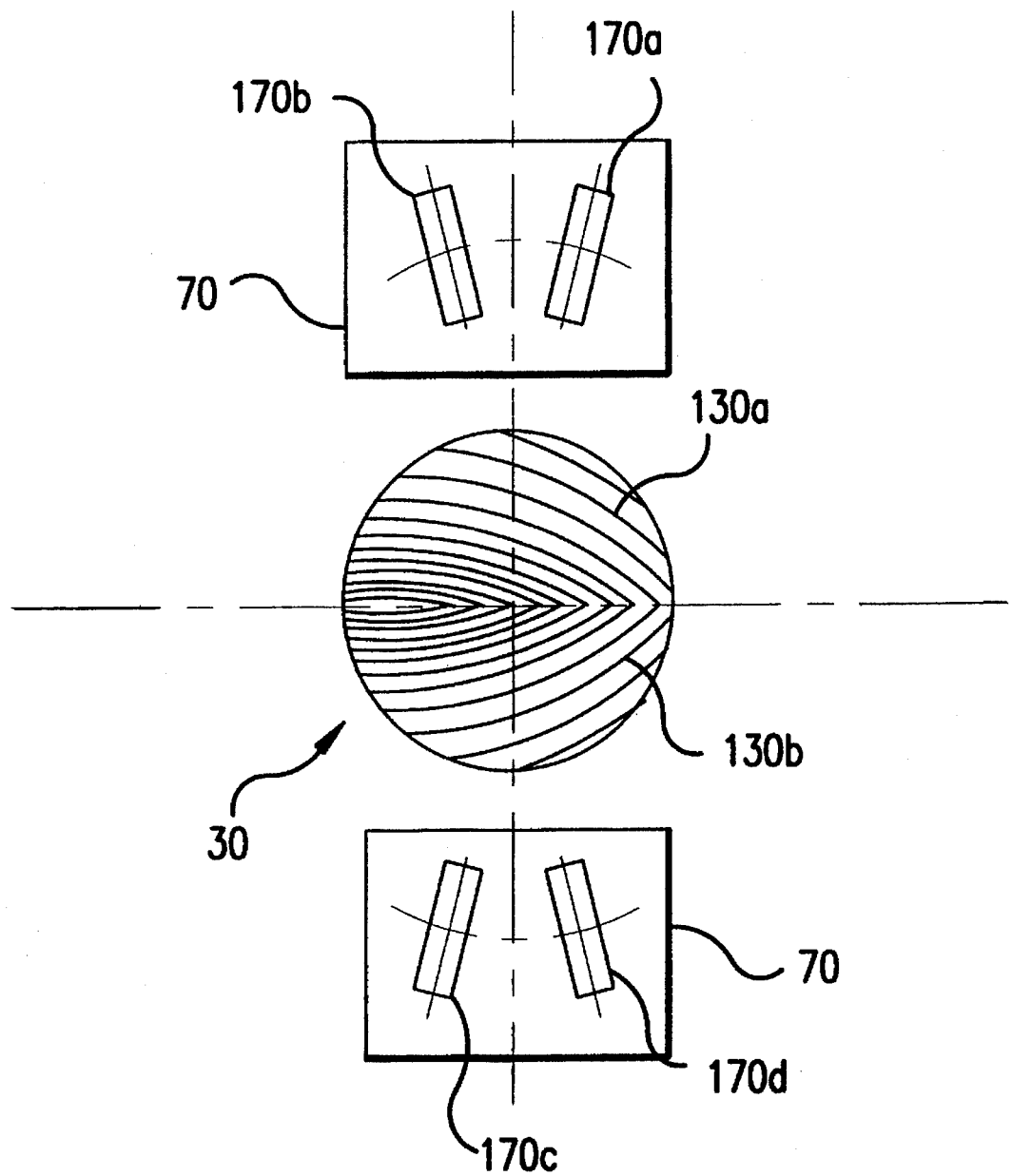
FIG. 4 is a plan view depicting the hologram element and the light detecting device shown in FIG. 1.

The signal-optical system in the optical head 1 will now be described. The specifications, particularly the magnification $\beta$, of the objective lens 50 should satisfy the requirement of the detection sensitivity regarding the focusing error, and thus $\beta = 1/5$. Thus, the following discussion will deal chiefly with the method of detecting the focusing error. FIG. 4 is a plan view illustrating the hologram element 30 and the light detecting device 70, seen from the location at which the objective lens 50, shown in FIG. 1, is located. The hologram element 30 has a hologram pattern divided into two patterns 130*a* and 130*b*. The light detecting device 70 has four slot-shaped light detecting patterns 170*a*, 170*b*, 170*c*, and 170*d*. The focusing error is detected by detecting the spot size that changes depending on the astigmatism. The hologram patterns 130*a* and 130*b* include nearly hyperbolic curves.

Figure 5:
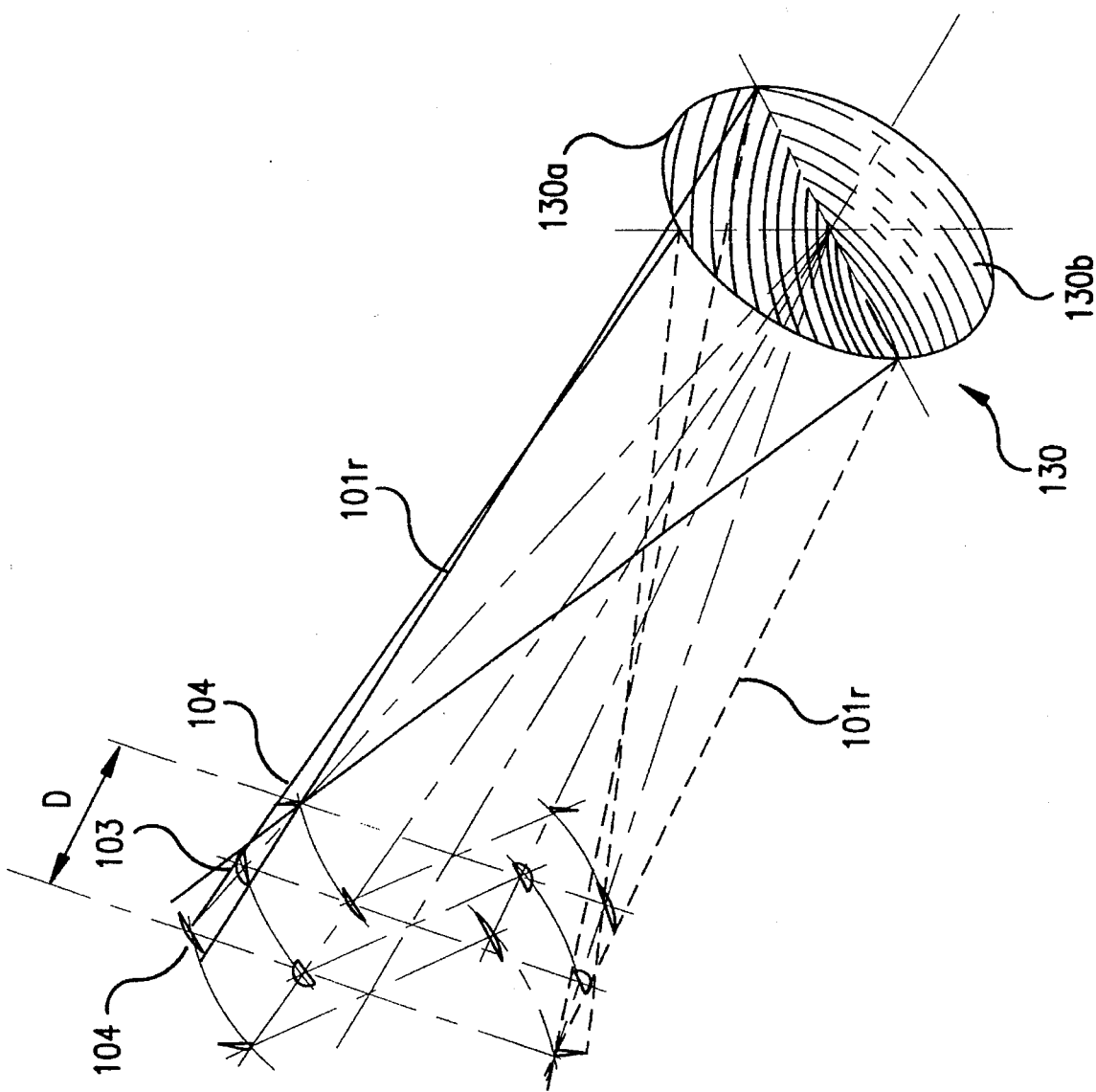
FIG. 5 is a perspective view illustrating the operation of the hologram element of FIG. 4.

FIG. 5 illustrates a backward light beam 101*r* produced by diffraction via the hologram patterns 130*a* and 130*b*. The degree of the convergence of the backward light beam 101*r* is equivalent to the $NA_I$ associated with the forward light beam (101*f* in FIG. 1) incident on the objective lens 50. It is equivalent to the $NA_I$ at the input side of the objective lens 50. In the present embodiment, the convex lens 20 is located in the middle of the path of the forward light beam, as shown in FIGS. 1 and 2. The effective $NA_I$ of the entire optical system associated with the forward optical path is increased to 0.14. However, the $NA_O$ associated with the backward optical path remains at 0.1. This can also be represented in terms of the magnification $\beta$ of the optical system as follows.

Overall Magnification $\beta'$ Associated with the

Forward Optical Path = $NA_I$ at the Input Side/$NA_O$ at the Output Side = 0.14/0.50 = 1/3.6

Magnification $\beta$ Associated with the Backward Optical

Path = 0.1/0.50 = 1/5

The NA and the magnification for the forward light beam can be set independently of those for backward light beam.

Figure 6A:
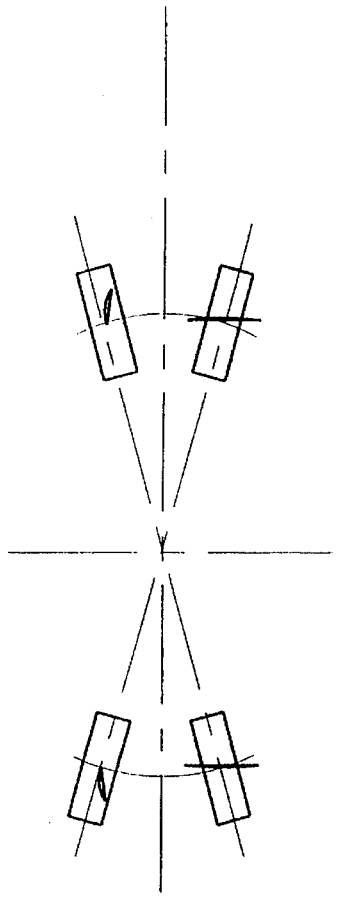
FIGS. 6(a)–(c) are plan views illustrating reception beam spots formed on the light detecting device depicted in FIG. 4.
Figure 6B:
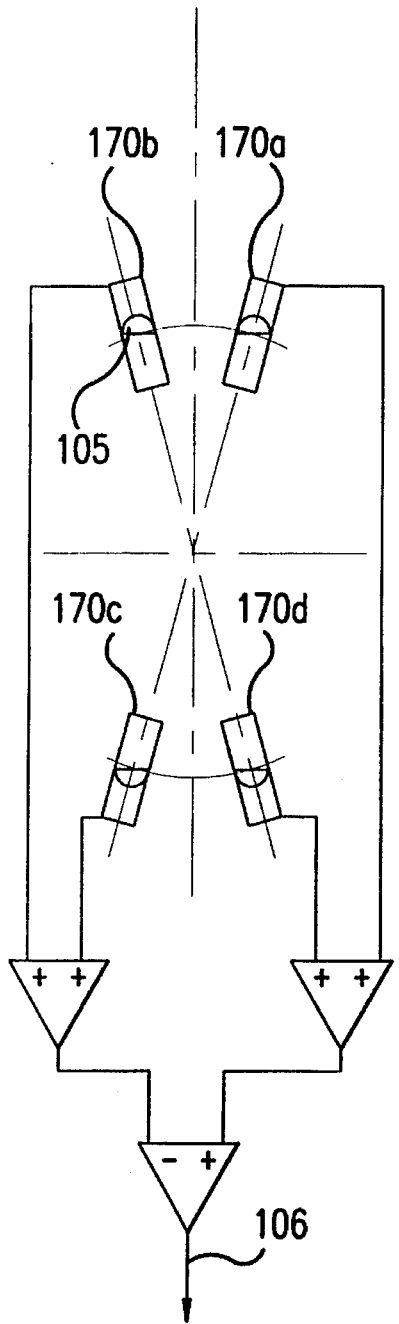
Figure 6C:
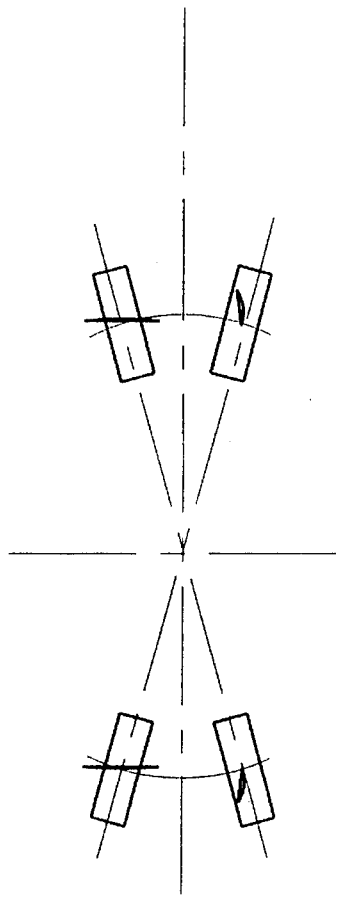

In FIG. 5, the distance D represents the astigmatic difference, or the distance between two focal lines 104, that occurs when the backward light beam 101*r* passes through the hologram patterns 130*a* and 130*b*. Reference numeral 103 denotes a circle of least confusion which is at a nearly central position between the focal lines 104. A light beam is diffracted by each of two hologram patterns 130a and 130b into +/− beams of the first order. Each hologram pattern divides one light beam into two beams. Therefore, four backward light beams 101r are produced by the hologram patterns 130(a) and 130(b). The light detecting device 70 has light detecting patterns 170a–170d disposed at four different positions, as shown in FIGS. 6(a)–(c). The four separated backward light beam 101r strike respective light detecting patterns 170 thereby forming reception light spots 105 on the respective light detecting patterns 170. The shape of each reception light spot 105 changes depending on the focusing error due to the astigmatism and thus the light power received by the reception light pattern 170 also changes, as shown in FIGS. 6(a)–(c).

In a reference state with no focusing error, each element of the optical system is adjusted such that the backward light beam 101r strikes on the light detecting device 170 at the center of the astigmatic difference D (i.e., focal line distance) shown in FIG. 5. This is the position at which the circle of least confusion 103 is formed. In the reference state, the astigmatic difference D is divided equally at both sides of the circle of least confusion 103. Therefore, if the focusing error is in the reference state, each reception spot 105 has the form of a circle of least confusion as shown in FIG. 6(b). In this case, each channel of the light reception pattern 170 receives the same light power. The focusing error signal 106 is produced according to the following equation:

$$(170a-170c)+(170d-170b)=(170a+170d)-(170b+170c)$$

Therefore, the focusing error signal 106 is zero in the reference state.

When the distance between the optical recording medium 60 and the objective lens 50 deviates from the reference distance, the focusing error increases. The convergence of the backward light beam 101r then changes according to the principle of geometrical optics. The position of the focal line 104, shown in FIG. 5, shifts toward the optical axis. The shape of the reception spots 105 change into an ellipse, as shown in FIG. 6(a) or 6(c). The light power detected by each channel of the light detecting device via each light detecting pattern 170 changes. This results in a change in the level of the focusing error signal 106. If it is assumed that the astigmatic difference is D, the magnification of the objective lens 50 is β, and the focusing error is d represented in terms of the distance, and if it is also assumed that the focusing error d is within the range in which an increase in the focusing error produces an increase in the focusing error signal and a decrease in the focusing error produces a decrease in the focusing error signal then $$d=D\times(\beta\times\beta)/2.$$

Figure 7:
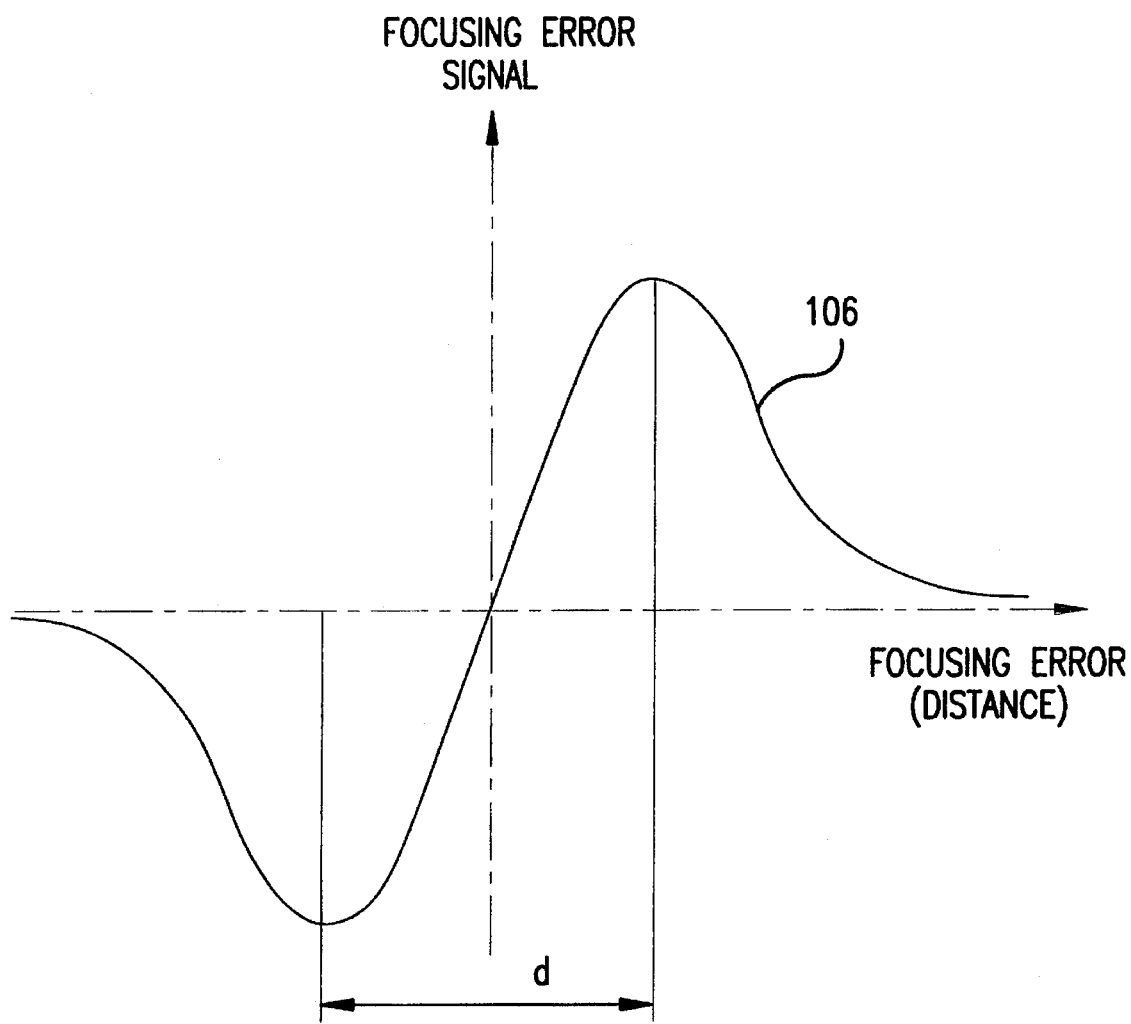
FIG. 7 is a graph illustrating a focusing error signal relating to the embodiment of FIG. 1.

Thus, the focusing error signal 106 changes in a fashion such as that shown in FIG. 7. In the present embodiment, the magnification of the objective lens 50 is set to ⅕, as described above, thus d=D/50. This produces sufficient sensitivity for detecting the focusing error signal.

The hologram 130 is divided into two parts in a radial direction of the optical recording medium 60, that is in a direction perpendicular to the track grooves, or in the direction corresponding to the push-pull modulation. It is possible to detect a tracking error signal by detecting a difference between the amount of a light beam passing through the pattern 130a of the hologram 130 and that of a light beam passing through the other part 130b and further converting the difference into an electric signal according to a known method. A reproduction signal of recorded information is generated by extracting AC components or modulation components of the intensity of the backward light beam. These signals can be represented in terms of signals detected via each channel 170a–170d of the light detecting device shown in FIG. 6 as follows:

Tracking Error Signal=(170a+170c)−(170b+170d); and

Reproduction Signal=(170a+170b+170c+170d).

The focusing error signal 106 and the tracking error signal are used as error signals in the focusing servo control and the tracking servo control, respectively. This accurately focuses the light beam into the spot 61 onto the optical recording medium 60. Information is written on the optical recording medium 60 by performing pulse modulation on the current flowing through the semiconductor laser 10.

In the present embodiment, as described above, the functions of an optical head can be realized using a simple optical system. Furthermore, the NA or the magnification associated with the forward light beam and those associated with the backward light beam can be set independently of each other. The coupling efficiency associated with the forward optical path can be improved greatly without exerting adverse effects on the detection sensitivity of the focusing error signal. This permits generation of sufficient light power to write information using a moderate-power semiconductor laser.

In an embodiment of the present invention, as described above, the magnification associated with the forward optical path (the overall magnification of the composite optical system including the objective lens 50 and the convex lens 20) is set to ⅓.6, and the magnification associated with the backward optical path is set to ⅕. Furthermore, the $NA_f$ associated with the forward optical path is set to 0.14, and the $NA_0$ associated with the backward optical system is set to 0.1. However, these are only an example of optimum values. In practice, the values can be varied within certain ranges around these optimum values. More specifically, values in the ranges described below may be employed in practical applications.

Magnification greater than ¼ (more preferably, in the range from ¼ to ⅓) for the forward optical path;

less than ¼ (more preferably, in the range from ⅙ to ¼) for the backward optical path;

Numerical Aperture (NA)

greater than 0.12 (more preferably, in the range from 0.12 to 0.2) for the forward optical path;

less than 0.12 (more preferably, in the range from 0.08 to 0.12) for the backward optical path.

When the values are within the preferred ranges described above, it is possible to satisfy various requirements such as the total length of the optical system (in general, from 10 mm to 30 mm), the NA of the objective lens (in general, from 0.45 to 0.55), the optical output power of the semiconductor laser (30 mW to 40 mW), and the write power (5 mW to 10 mW). Additionally, when the values are in the above-described ranges, it is also possible to achieve a coupling efficiency ″ as high as about 32% in the forward optical path. This produces a consistent light power distribution.

Furthermore, in the embodiment described above, a convex lens 20 with a spherical or aspheric lens surface 21 or 22 (either lens surface may also be flat) is employed as the lens element. The purpose of the lens elements, however, is to exert positive refracting power on the forward light beam 102, 101f. Therefore, a lens element having a cylindrical surface, anamorphic surface, or the like may also be employed. With this arrangement, it is possible to realize directivity in the refracting power, and correct an asymmetric distribution of the intensity of light emitted by the semiconductor laser 10 (the "asymmetric" distribution refers here to a difference between the intensity of light in the direction parallel to the junction plane and that in the direction perpendicular thereto). This further improves the coupling efficiency. Alternatively, the lens surface 21 can be replaced with a grating lens, a Fresnel lens, or the like.

In the embodiment described above, the additional lens element 20 is disposed only in the forward optical path. Another lens element, however, may be disposed in the backward light beam to adjust the detection magnification of the focusing error signal associated with the backward optical path.

Figure 8:
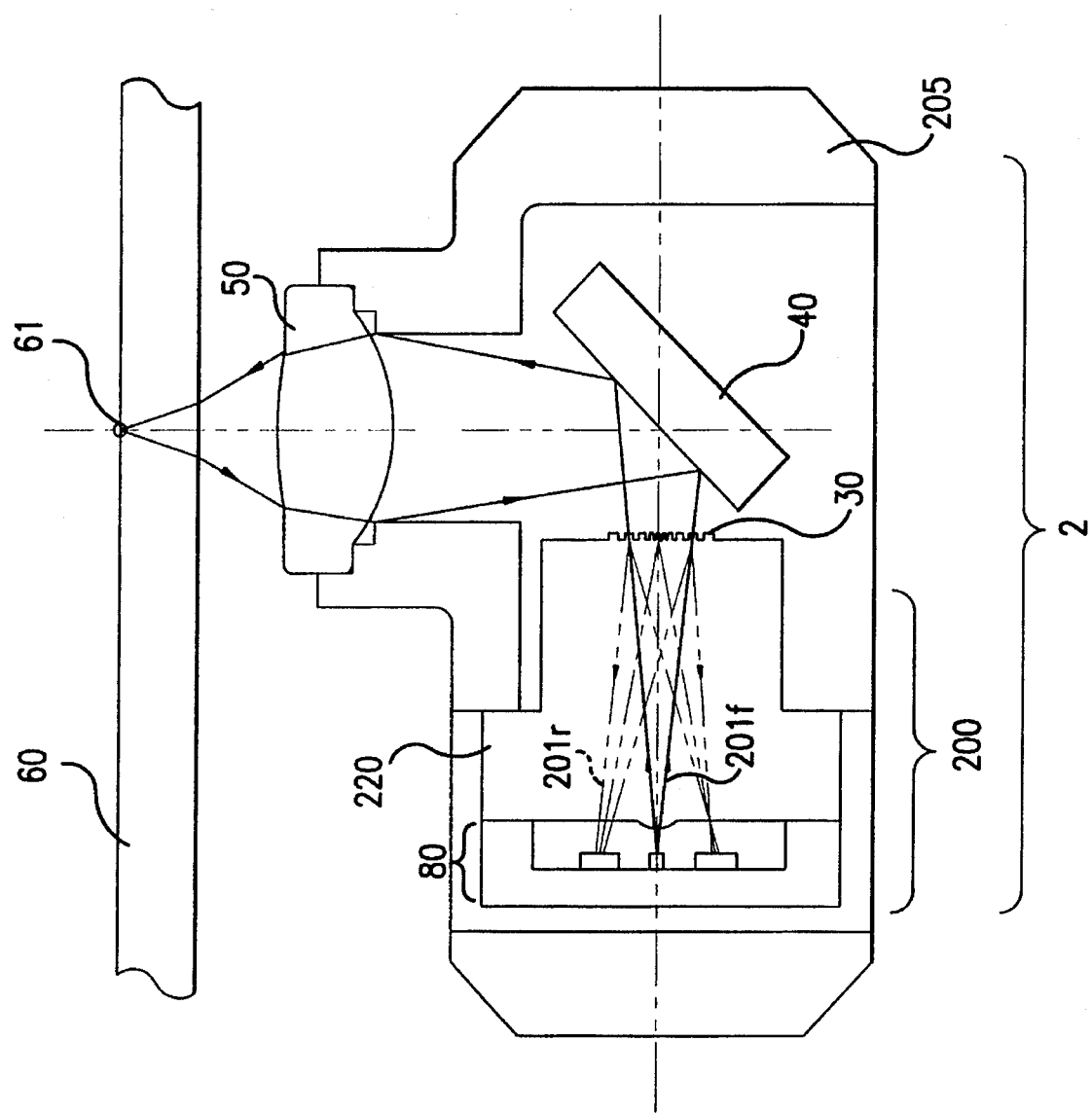
FIG. 8 is a cross-sectional view of an optical head according to another embodiment of the present invention.
Figure 9:
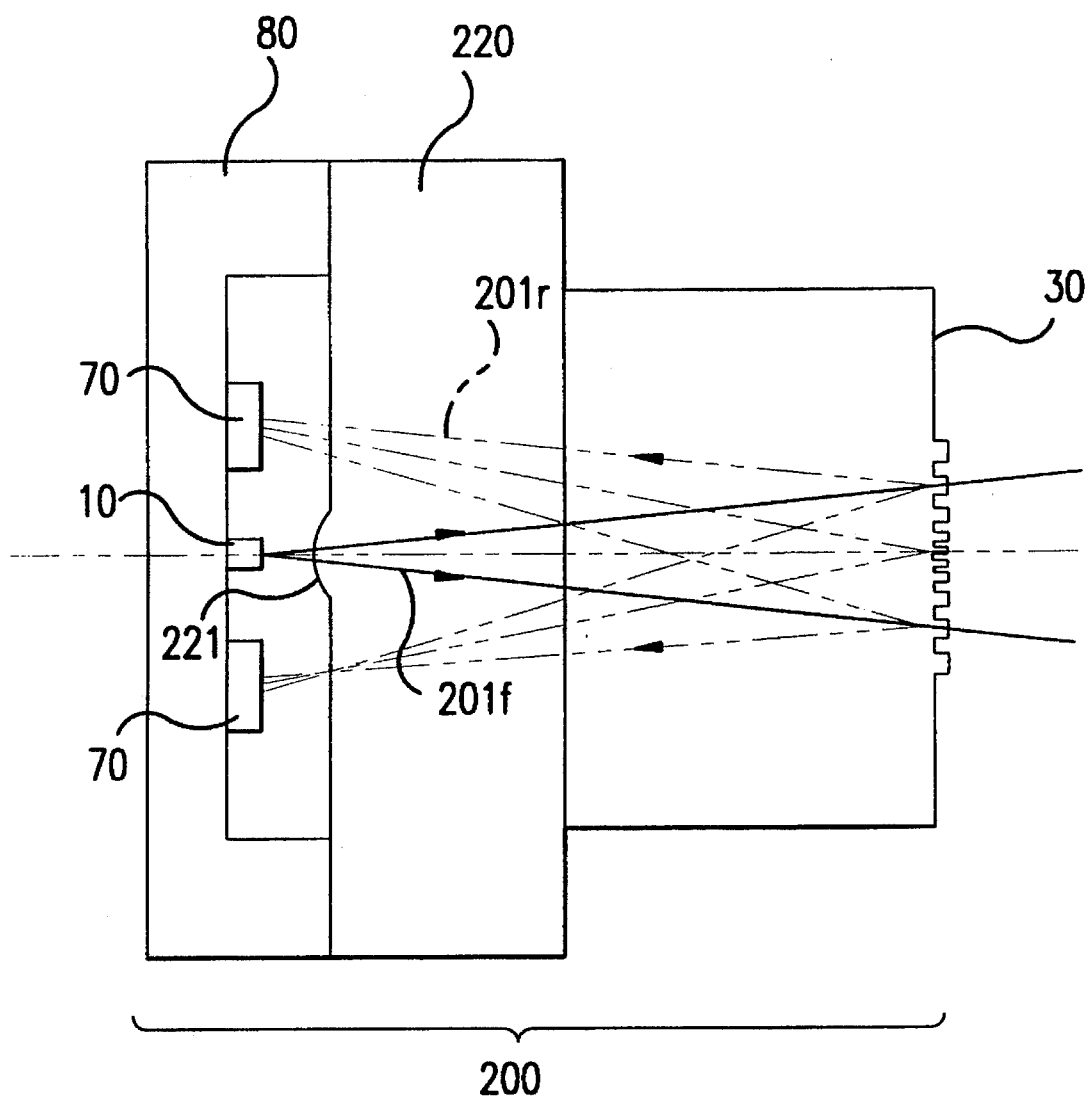
FIG. 9 is an enlarged schematic diagram illustrating an emitting and receiving optical unit of FIG. 8.

FIGS. 8 and 9 depict an optical head 2 according to another embodiment of the present invention. In FIG. 9, the emitting and receiving optical unit 200 of FIG. 8 is shown in an enlarged fashion. As shown in FIG. 8 and 9, the optical head 2 includes a light emitting device such as a semiconductor laser 10, a hologram element 30 having curved grooves acting as a diffraction grating, an objective lens 50, and a light detecting device 70 having a multisegment photodiode. The optical head 2 further includes a housing 80 for accommodating the semiconductor laser 10 and the light detecting device 70. A transparent cover 220 is placed via an adhesive on the opening of the package 80 to seal the housing 80. A mirror 40 for deflecting the optical path is provided to reduce the overall height of the optical head. The emitting and receiving optical unit 200 is formed with the housing 80, the cover 220, and the hologram element 30. The external appearance of the emitting and receiving optical unit 200 has a cubic shape as small as 5 mm in length of each edge. The housing 80 can be made preferably of ceramic, epoxy resin, or the like.

Figure 18:
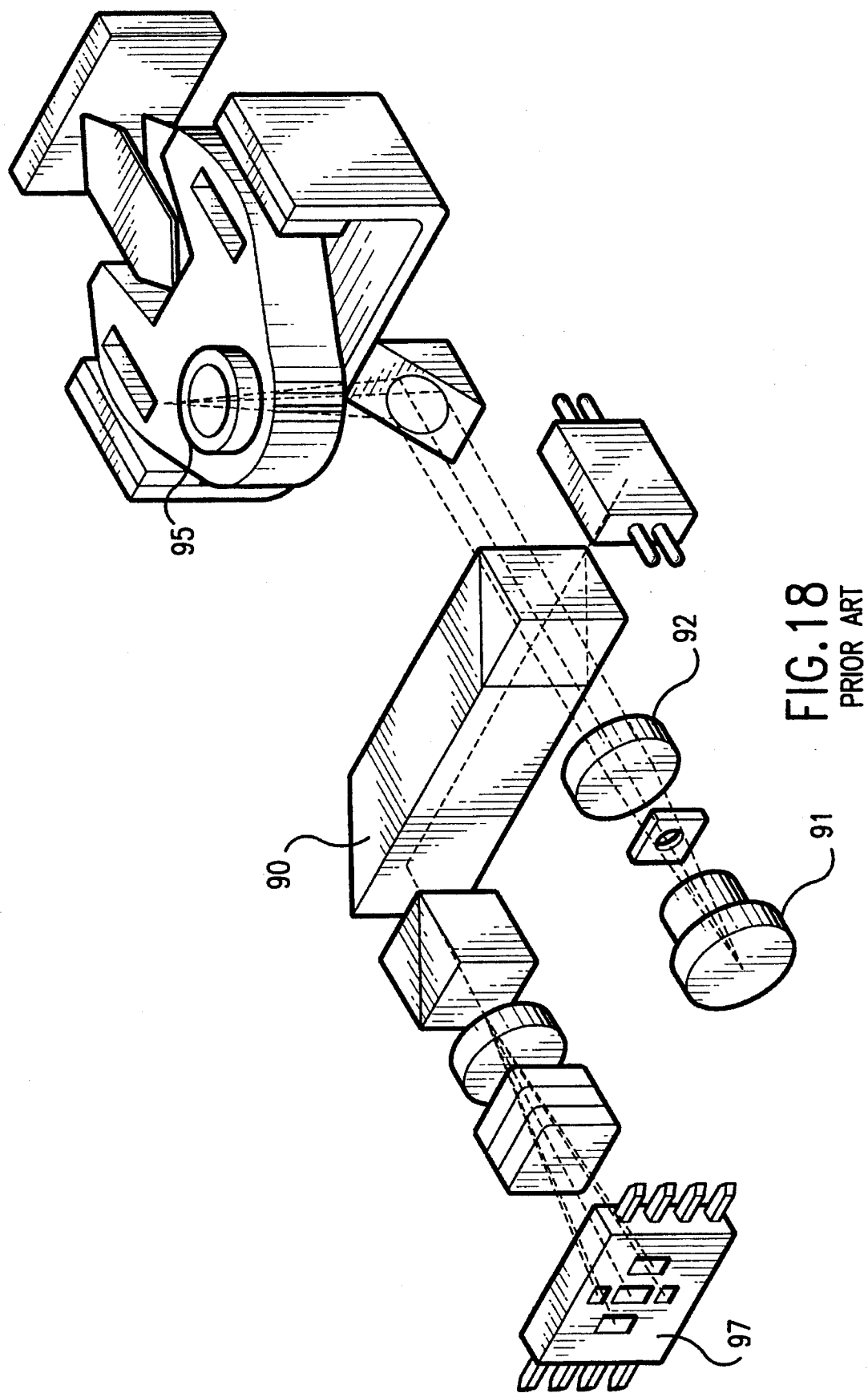
FIG. 18 is a perspective view illustrating another conventional optical head.
Figure 1:
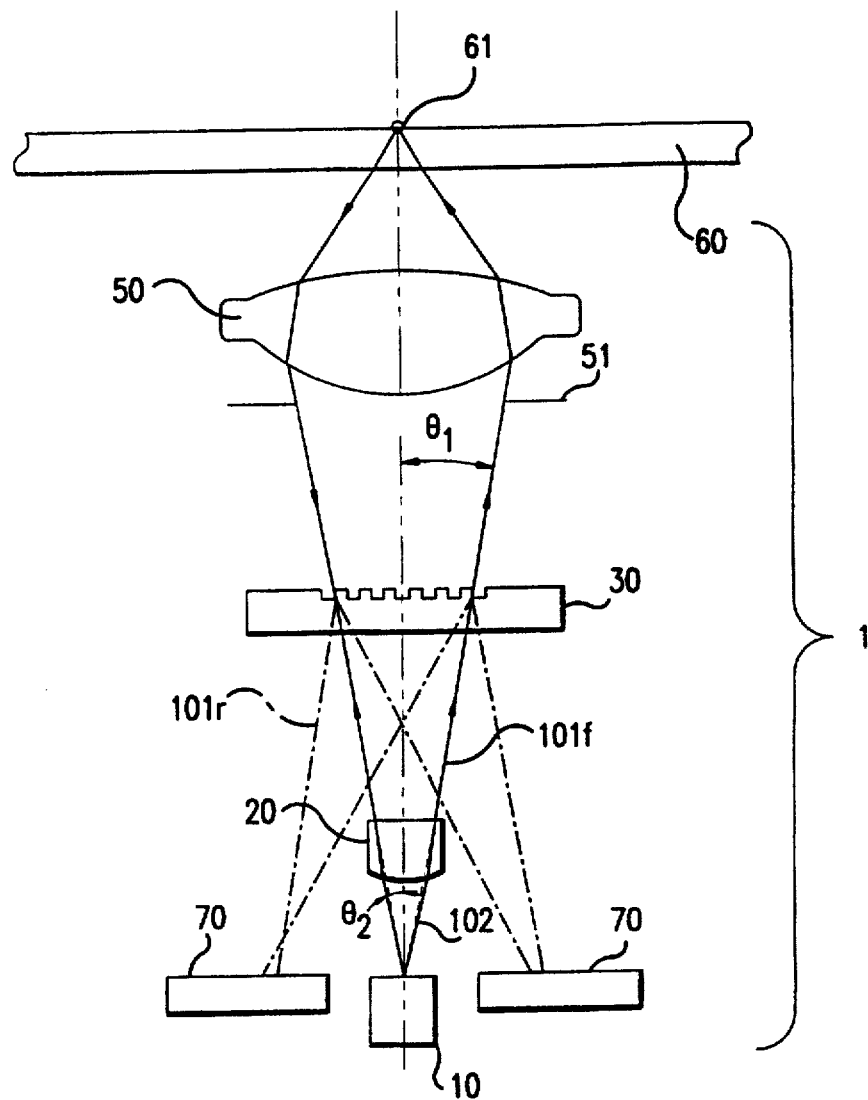
Figure 2:
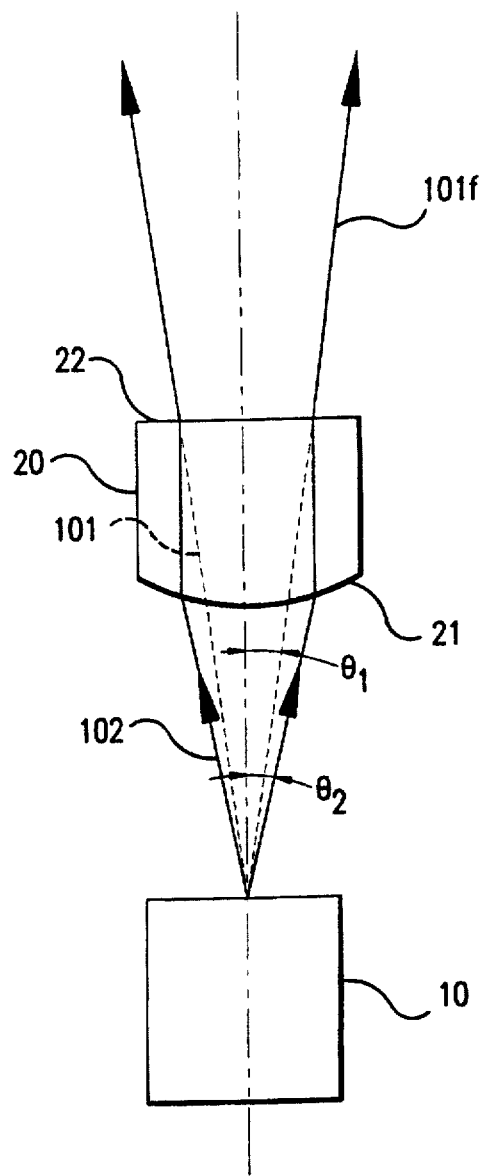
Figure 14:
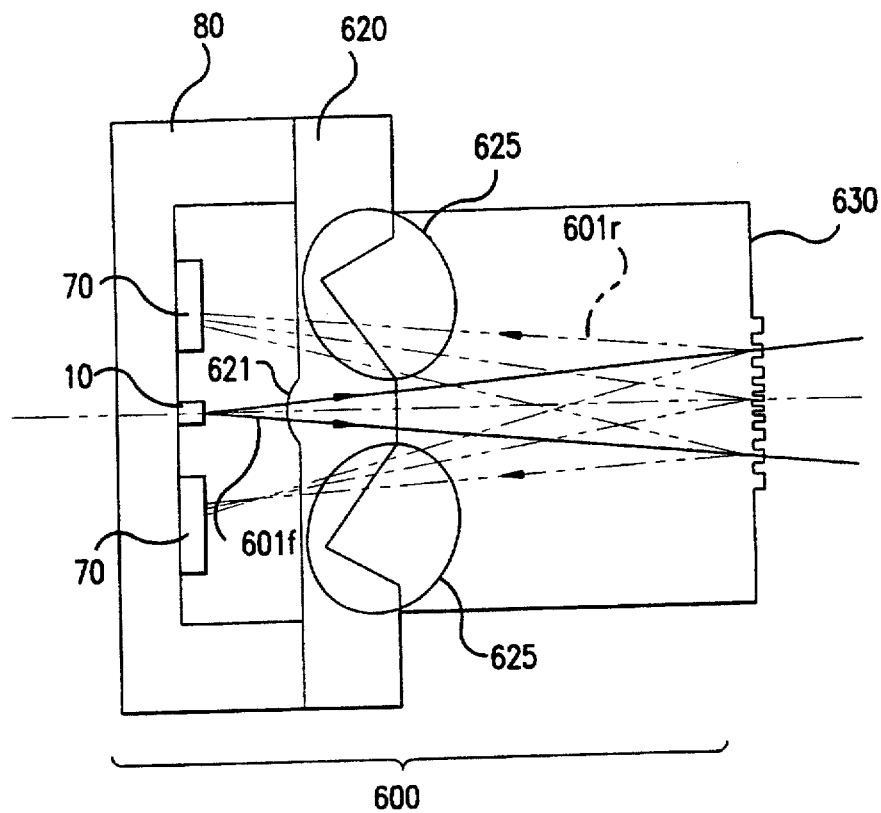
Figure 17:
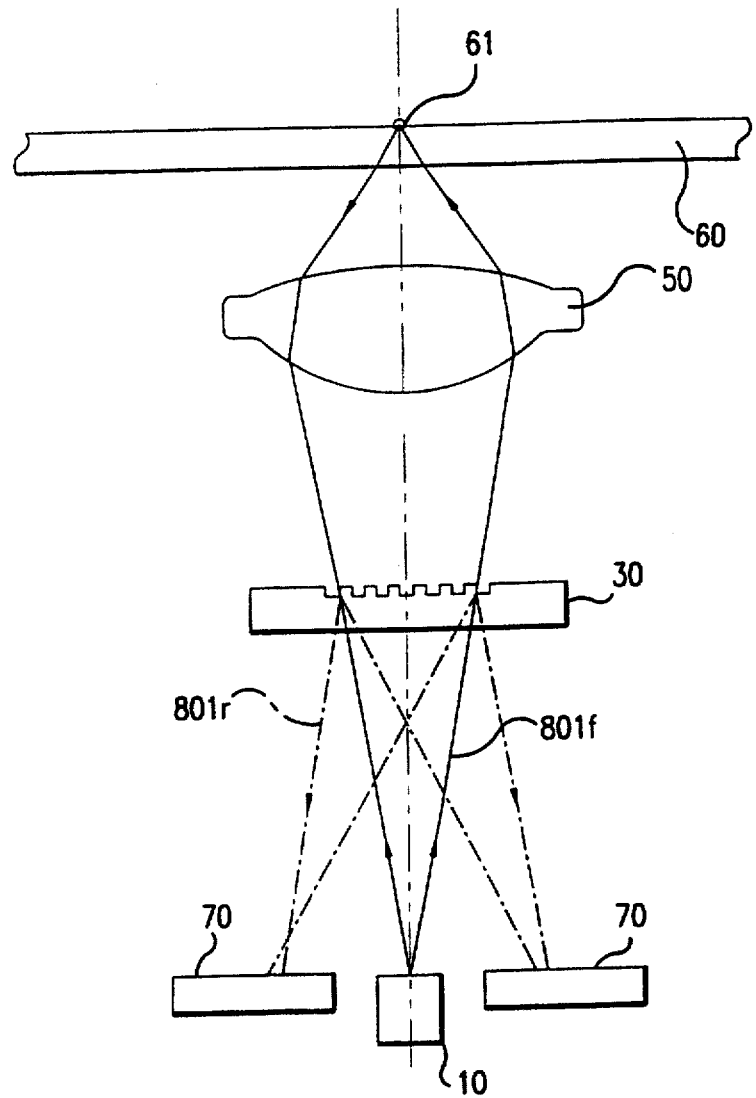
Figure 18:
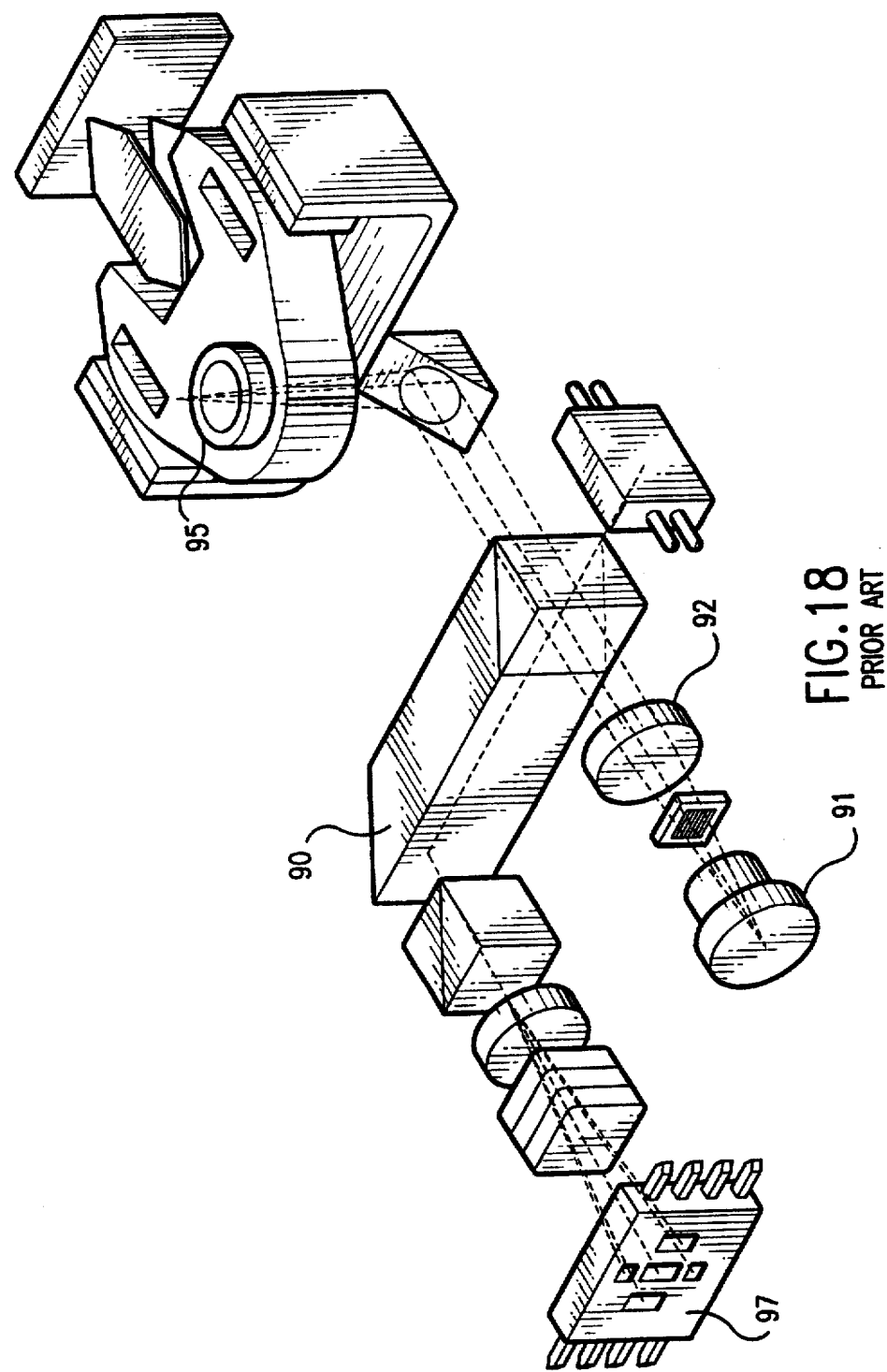

In FIG. 8, a holder 205 accommodates the above-described optical head 2 so that the entire system can be driven as a whole (according to the focusing servo control and the tracking servo control). Therefore, unlike the previously-described second conventional optical head, as shown in FIG. 18, in which only the objective lens is driven by means of an actuator, the dimensions of the optical system of the present embodiment are maintained constant. In this arrangement, in principle, no change in magnification or field angle occurs and it is possible to achieve stable detection of a signal. The focusing error signal, tracking error signal, and the reproduction signal are detected as described above.

As shown in FIG. 9, a convex lens part 221 is formed on the transparent cover 220 on the side adjacent the semiconductor laser 10. This forms a composite optical element in which different functions are integrated. The cover 220 can be made easily of optical plastic such as PMMA (poly methyl methacrylate), PC (polycarbonate), or APO (amorphous polyolefin) by injection molding. Alternatively, the cover 220 may also be made of low-melting glass by hot pressing. PMMA, however, is preferred from the view points of a low material cost and a reduction in birefringence.

The convex lens part 221 formed on the cover 220 functions in the same manner as the convex lens 20, described above. As a result, the coupling efficiency $\eta$ associated with the forward optical path can be improved greatly without exerting adverse effects on the detection sensitivity associated with the focusing error signal. The integral design of the convex lens part 221 with the cover 220 permit realization of the advantages of the present invention without increasing the number of component elements. Integrated lens part 221 and cover 220 are fixed to the housing 80. As a result, any deviation in position of the lens part 221 relative to the semiconductor laser 10 is minimized. This arrangement also permits easy assembly of an optical head. Thus, a small high-performance optical head having high reliability is realized.

The refracting power of the convex lens 221 is not very large. As a result, the optical aberration occurring in the convex lens part 221 is slight so long as the optical axis of the convex lens part 221 (i.e., the line passing through the vertex of the spherical surface) is coincident with the optical axis of the semiconductor laser 10 with sufficient accuracy. For example, when these optical axes are deviated from each other by about 100 μm, then the RMS (root mean square) value of the wave front aberration of the forward light beam is increased by an amount of 0.03λ (λ denotes the wavelength of the light beam). This produces degradation in performance that cannot be neglected. To reduce the aberration to an acceptable level, the deviation between the optical axes should be less than 30 μm. This is difficult to achieve when only improving the accuracy of each component element. Thus, it is very desirable to effectively positioning the optical axis of the convex lens part 221 with sufficient accuracy. An image recognition apparatus can be preferably used to achieve accurate positioning.

When using the image recognition apparatus, an alignment mark (not shown) is disposed in a peripheral region of the convex lens part 221 of the cover 220, while another alignment mark is formed on the light detecting device 70. These two alignment marks are detected via the image recognition apparatus and positioned relative to each other by using a fine positioning apparatus. The semiconductor laser 10 and the light detecting device 70 can also be positioned relative to each other using a similar apparatus, thereby achieving the above-described requirement regarding the accuracy in the positioning of the optical axis of the convex lens 221 relative to the optical axis of the semiconductor laser 10.

The cover 220 and the hologram element 30 are produced separately. Alternatively, these two elements may also be formed into an integral fashion using injection molding. Additionally, a step-type or grating-type lens such as a Fresnel lens or a grating lens may also be employed as the convex lens part 221.

Figure 10:
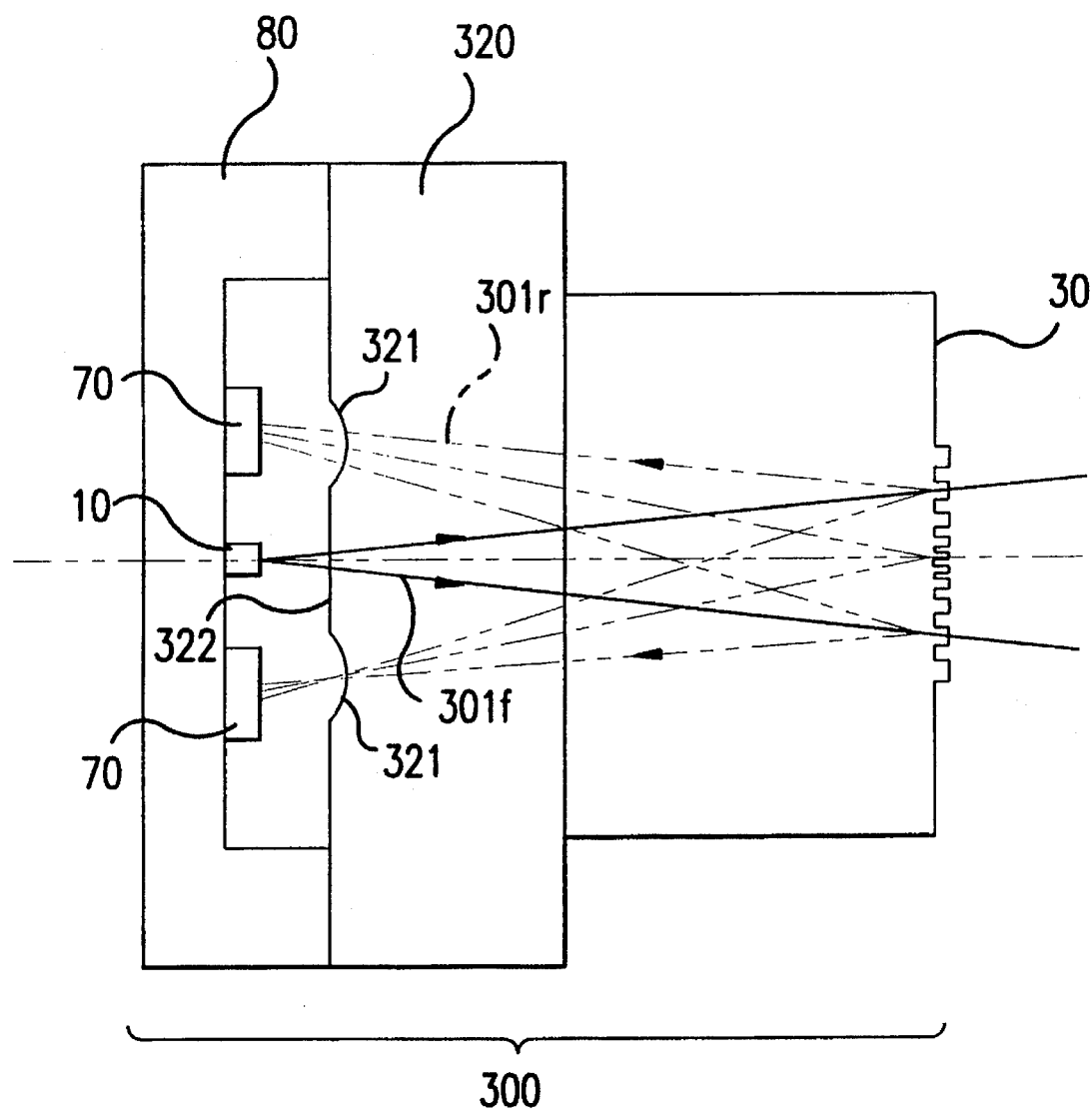
FIG. 10 is a cross-sectional view illustrating an emitting and receiving optical unit of another optical head according to an embodiment of the present invention.

FIG. 10 illustrates another emitting and receiving optical unit for use in an optical head according to an embodiment of the present embodiment. This emitting and receiving optical unit 300 is formed with a housing 80, a cover 320, and a hologram element 30. The external appearance of the emitting and receiving optical unit 300 has a cubic shape as small as 5 mm in length of each edge.

The concave lens 321 is not disposed in the path of the forward light beam 301f but disposed only in the path of the backward light beam 301r. The cover 320 can be made preferably of optical plastic such as PMMA (poly methyl methacrylate) or the like using injection molding. In the embodiments described above, the convex lens 20 or the convex lens part 221 are positioned in the forward optical path in order to increase the coupling efficiency λ associated with the forward optical path. However, an inverse approach is also possible. Instead of employing an objective lens 50 having a bare magnification of ⅕, an objective lens 50 having a magnification of about ⅓.6 thereby obtaining a high coupling efficiency $\eta$. The magnification associated with the backward optical path may decrease using lens part 321.

The concave lens part 321 decrease the magnification associated with the backward optical path. More specifically, the above purpose is achieved by employing a concave lens part having a curvature radius R2. The optical system according to the present embodiment is designed according to an approach opposite that used in the previous embodiments, discussed above. In this embodiment, unlike the previous embodiments, the coupling efficiency $\eta$ associated with the forward optical path is increased first to an acceptable value by optimizing the specifications of the objective lens, and then the concave lens is disposed so as to decrease the magnification associated with backward optical path. This expands the degree of freedom in the design of the optical system.

Additionally, it is also possible to combine the use concave and convex lenses on the transparent cover. The track error can be detected using known methods including the three-beam method. In this case, a diffraction grating is formed in a flat area of the cover 320 so that a sub-beam is generated in the forward optical path 301f.

Figure 11:
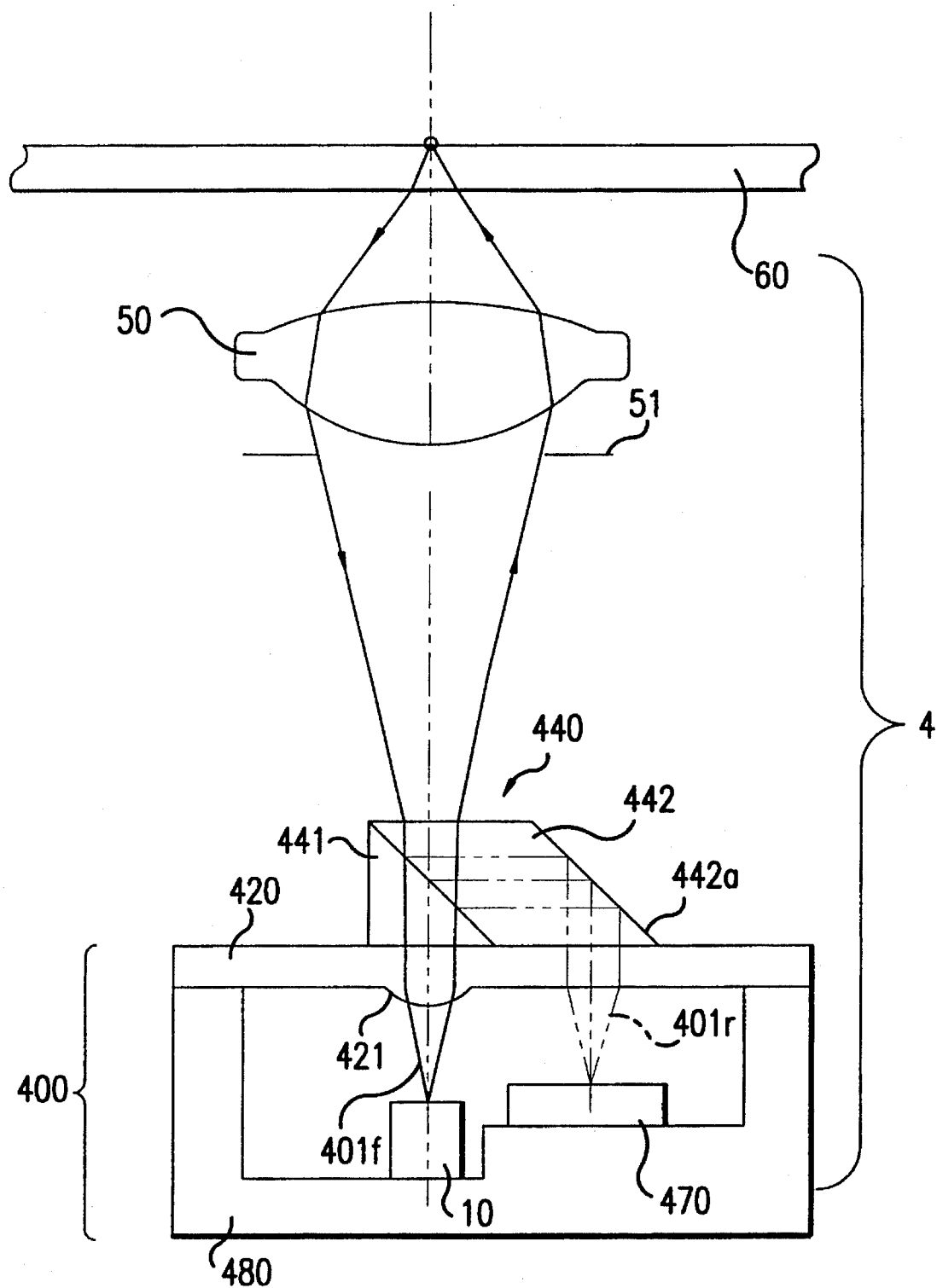
FIG. 11 is a cross-sectional view illustrating an optical head according to another embodiment of the present invention.

In the previous embodiments described above, the forward light beam and the backward light beam are separated from each other by hologram element 30 acting as a light beam separator. However, a small-sized beam splitter 440 may be employed for this purpose, as shown in FIG. 11. The optical head 4, shown in FIG. 11, includes a semiconductor laser 10, an objective lens 50 and a light detecting device 470 having a multisegment photodiode. The optical head 4 also includes a housing 480 for accommodating the semiconductor laser 10 and the light detecting device 470 and a transparent cover 420. The cover 420 is secured using an adhesive on the opening of the housing 480 thereby sealing the housing 480.

A convex lens part 421 is formed on the cover 420 to improve the overall magnification as well as the NA associated with the forward optical path thereby improving the coupling efficiency $\eta$. Furthermore, a small sized beam splitter 440 is mounted on the cover 420. The beam splitter 440 is composed of a triangular prism 441 and a parallelogram prism 442. Also, an optical multi-layer film is deposited by means of evaporation on either prism 441 or prism 442 so as to control the transmission and the reflection of the light beam. The principle itself of the optical multi-layer film is disclosed in various literature and well known. Alternatively, a half mirror that is made by depositing an optical multi-layer film on a simple flat plate may be substituted for the beam splitter 440.

The backward light beam 401r is separated by the beam splitter 440 and introduced into the light detecting device 470 in housing 480. The light detecting device 470 contains a light detecting pattern (not shown) divided into a plurality of segments for signal detection. The focusing error detection according to the astigmatism method can be accomplished, for example, by adding a cylindrical lens to the optical system shown in FIG. 11. The cylindrical lens is positioned in the path of the forward light beam 401r thereby producing astigmatism. In practice, the above arrangement can be realized by forming the reflection plane 442a of the parallelogram prism 442 into a cylindrical form, or by disposing a small-sized cylindrical lens (not shown) between the cover 420 and the light detecting device 470. The reflection plane 442a of the parallelogram prism can be formed into a cylindrical shape, for example, by injecting a resin into a mold thereby forming a parallelogram prism having a desired shape. This method is excellent in productivity when applied to mass production. Additionally, either the triangular prism 441 or the parallelogram prism may be integrated with the cover 420.

The track error can be detected using known methods, such as, for example, the push-pull method or the three-beam method. When the three-beam method is employed, a diffraction grating having simple straight line grooves may be positioned in the path associated with the forward light beam 401f. Alternatively, a diffraction grating, not shown, may be formed directly on the surface of the convex lens part 421 of the cover.

The convex lens 421 is disposed in the path associated with the forward light beam 401f so as to improve the coupling efficiency associated with the forward optical path as in the previous embodiments. Furthermore, the small-sized beam splitter 440 is mounted on the cover 420 so as to introduce the forward light beam 401f and the backward light beam 401r into the inside of the housing 80 in parallel. This makes it possible to accommodate both the semiconductor laser 10 and the light detecting device 470 into the housing 80 thereby forming a small-sized integrated emitting and receiving optical unit 400.

The convex lens part 421 is formed on the cover 420 and positioned in the optical path associated with the forward light beam. Alternatively, a concave lens may be disposed in the optical path associated with the backward light beam.

A magneto-optical disk may be used as an optical recording medium. Additionally, a polarizing element for detecting a reproduction signal may be installed in an emitting and receiving optical unit.

Figure 12:
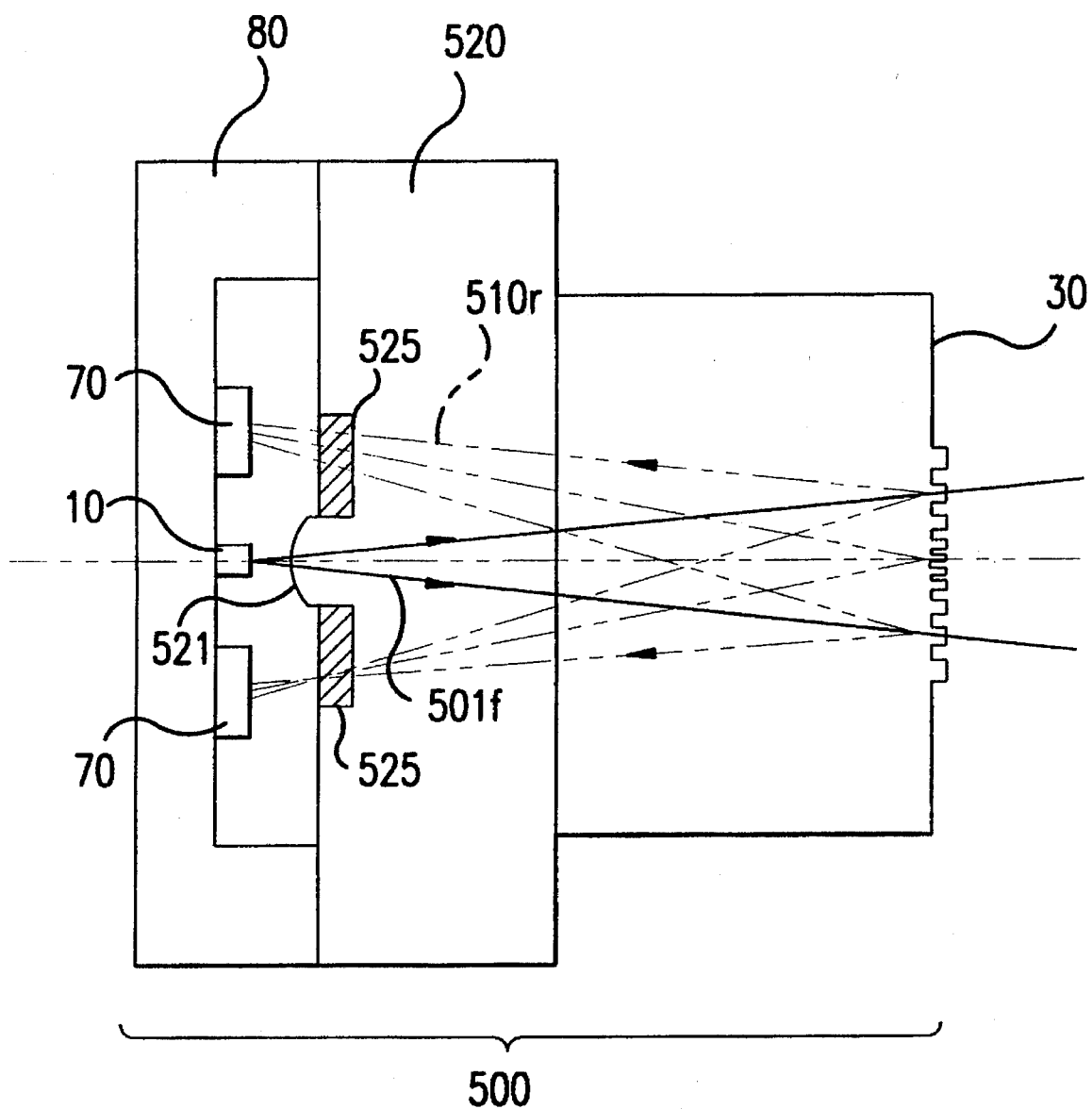
FIG. 12 is a cross-sectional view illustrating an emitting and receiving optical unit according to another embodiment of the present invention.
Figure 13:
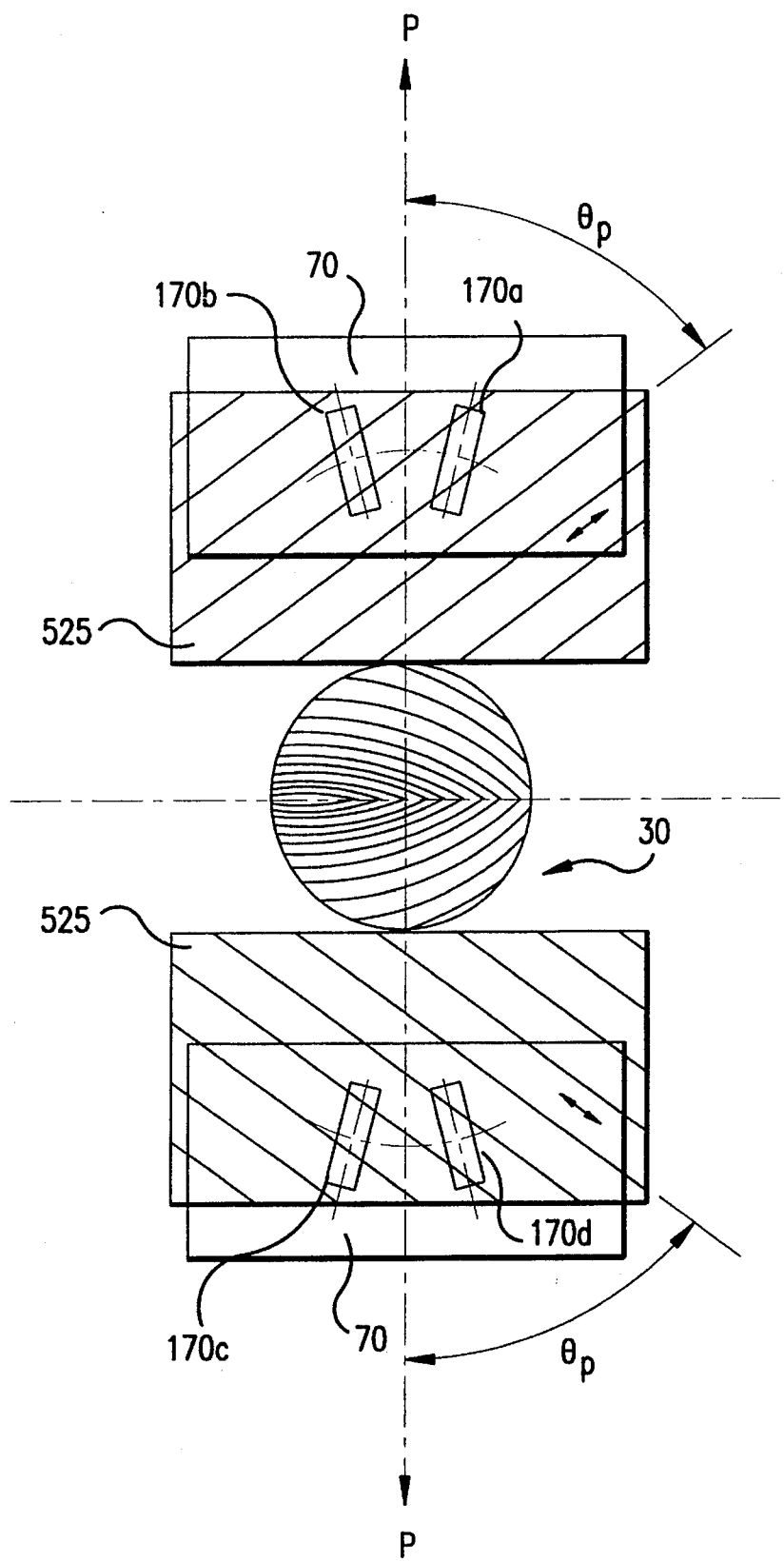
FIG. 13 is a plan view illustrating the interior of the emitting and receiving optical unit of FIG. 12.

FIG. 12 is a cross-sectional view illustrating the emitting and receiving optical unit 500 of an optical head. FIG. 13 illustrates the inside of the emitting and receiving optical unit 500. In this embodiment, a convex lens part 521 is formed on a cover 520. Also, a pair of polarizing plates 525 are embedded in the cover 520 at both sides of the convex lens part 521. It is preferable that the polarizing plate 525 has an extinction ratio of about 100:1 and transmittance of about 80%.

The pair of polarizing plates 525 are positioned in such a manner that the polarization transmission direction (the direction of the polarization plane in which the transmittance becomes maximum) of the polarizing plates 525 is at an angle θp to the polarization plane P of the semiconductor laser. Also, the pair of polarizing plates are disposed in a symmetric fashion, as shown in FIG. 13. When the polarization transmission angle θp is set to a value in the range of 30° to 60°, it is possible to detect the Kerr rotation angle or the modulation components contained in the backward light beam 501r that is a light beam reflected from a magneto-optical disk (not shown). The Kerr rotation angle can be detected according to the principle disclosed in U.S. Pat. No. 4,933,924 by the inventor of the present invention. The backward light beam, after passing through the pair of polarizing plates 525, is detected by the light detecting device 570 and converted into electric signals by channels 570a–570d. The resultant signals detected by the respective channels of the light detecting device are further subjected to the operation represented by the following equation thereby producing a signal indicating the Kerr rotation angle.

Magneto-Optical Signal=(170a+170b)−(170c+170d)

With this arrangement, it is possible to greatly improve the coupling efficiency associated with the forward optical path, without reducing the detection sensitivity associated with the focusing error signal. Also, the polarizing plate 525 is integrated onto the cover 520 thereby realizing further complex functions which make it possible to realize a small-sized and simple optical head suitable for use in magneto-optical recording and reproducing.

Figure 14:
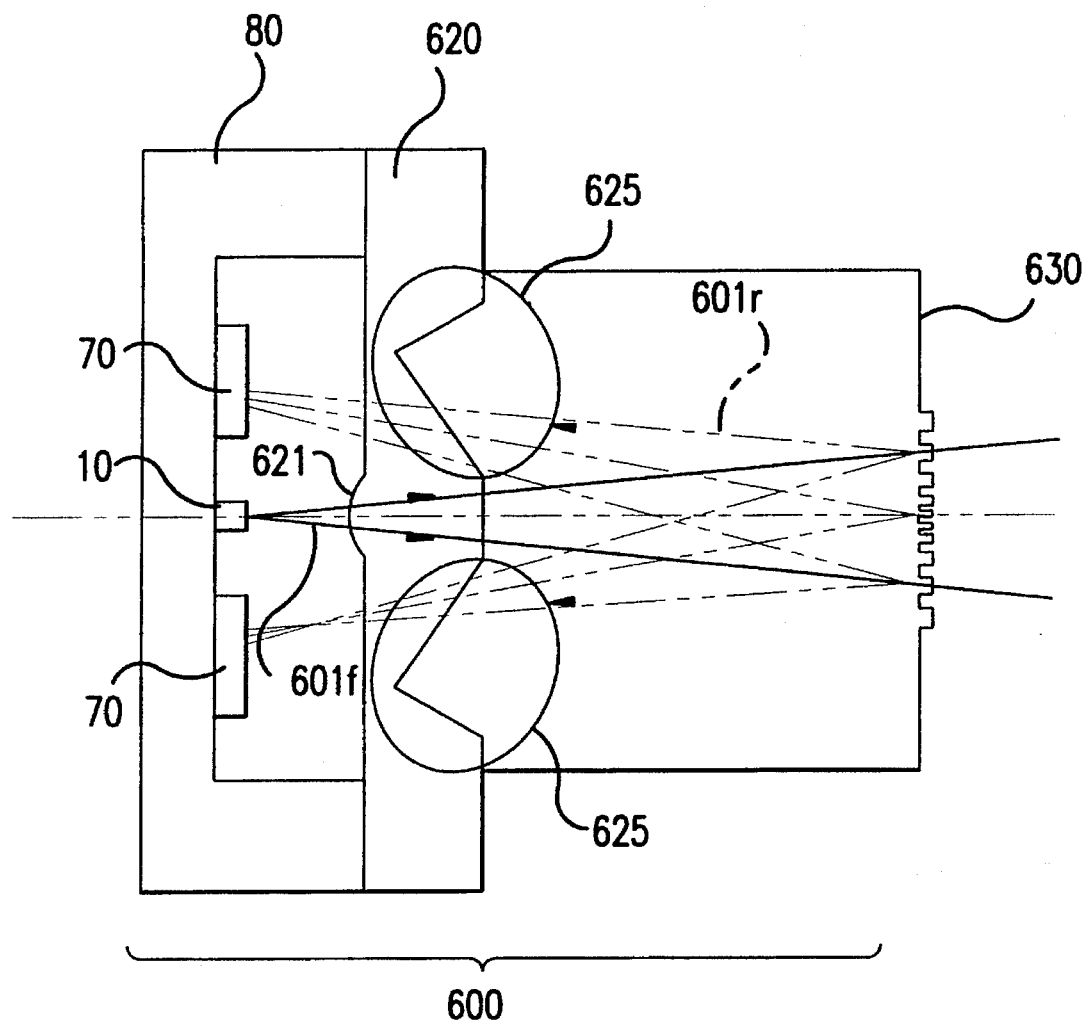
FIG. 14 is a cross-sectional view illustrating an emitting and receiving optical unit according to another embodiment of the present invention.
Figure 15:
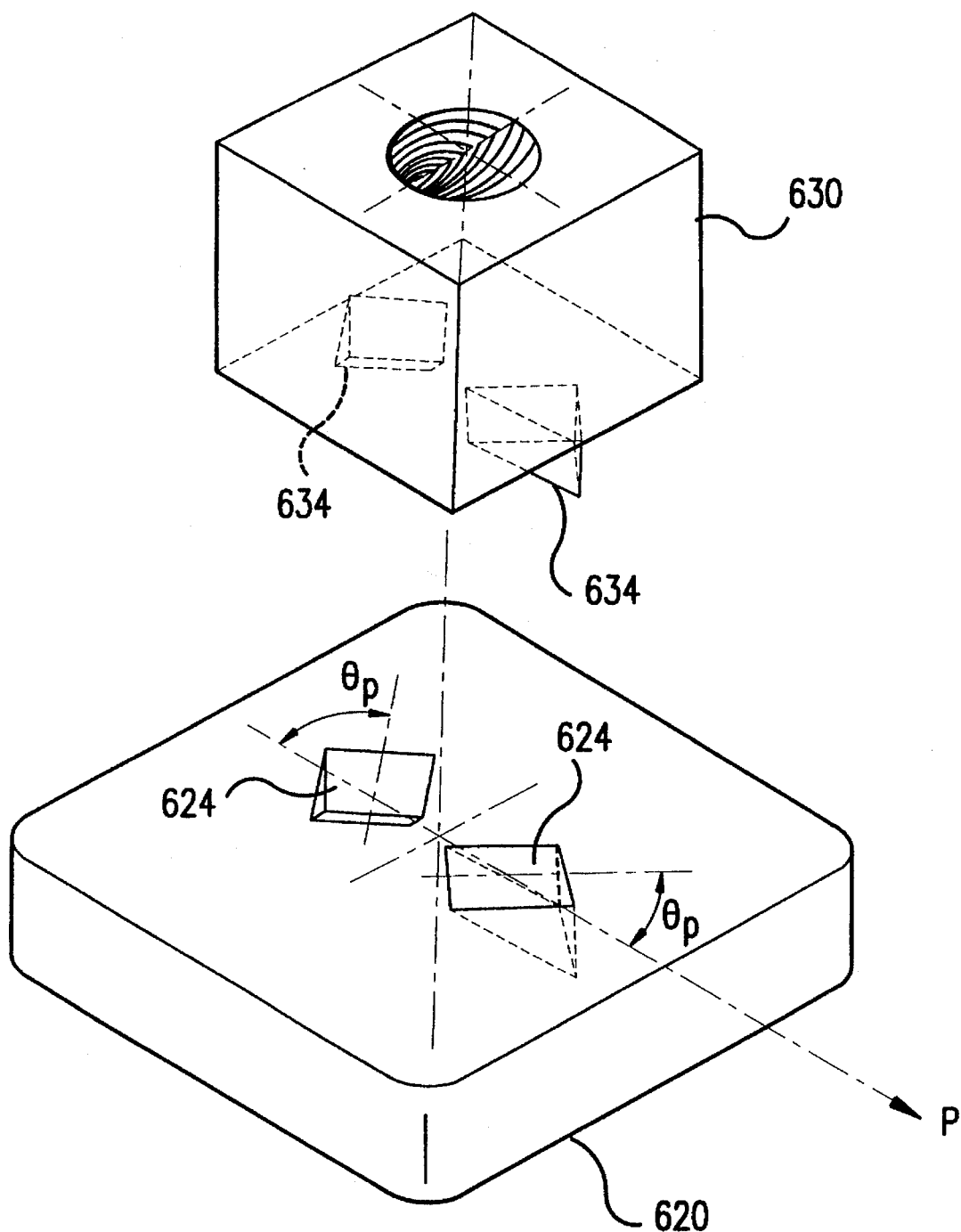
FIG. 15 is an exploded perspective view illustrating a polarizing element for use in the emitting and receiving optical unit of FIG. 14.

FIG. 14 is a cross-sectional view illustrating an emitting and receiving optical unit 600. FIG. 15 is an exploded perspective view illustrating the polarizing element of the emitting and receiving optical unit 600. As shown in FIGS. 14 and 15, a convex lens part 621 is formed on a lower surface (i.e., the surface nearest to the semiconductor laser) of a cover 620 at a center position. On the other surface, a pair of slanted planes 624 in recessed regions are formed. The pair of slanted planes 624 are formed in a symmetric fashion and in such a manner that the plane containing the normal of the planes 624 as well as the optical axis (that is, the direction that gives the maximum angle of inclination) makes an angle θp relative to the polarization plane P of the semiconductor laser, as shown in FIG. 15. It is preferable that the angle θp is set to a value in the range of 30° to 60°. On the other hand, a pair of raised and slanted planes 634 are formed on the hologram element 630 wherein the pair of slanted planes 634 are formed at locations corresponding to the slanted planes 624 formed in the recessed regions of the cover 620 and wherein these planes 634 have the same gradient as the slants 624. The cover 620 and the hologram element 630 can be formed of an optical plastic such as PMMA by injection molding. Additionally, a hologram pattern for separating a light beam is formed on the other surface of the hologram element 630.

A polarizing optical thin film is deposited, for example, by evaporation on the pair of slanted planes 634 formed on the hologram element 630. The polarizing optical thin film (not shown) can be formed by evaporating alternately a material such as magnesium fluoride having a low refractive index and a material such as zinc sulfide having a high refractive index thereby forming a multi-layer film. The cover and the hologram element are connected to each other using a transparent adhesive so that the slanted planes 634 of the hologram element and the slanted planes 624 of the cover come into close contact with each other thereby forming a pair of polarizing prisms 625 (as shown in FIG. 14). This produces a complete polarizing element.

The polarizing transmission direction of each polarizing prism 625 is a direction that gives the maximum gradient of each slanted plane 624. The angle θp made by this plane relative to the polarization plane P of the semiconductor laser is equivalent to the polarizing transmission angle θp of the polarizing plate 525, shown in FIG. 13. The polarizing prisms 625 can have higher performance than the polarizing plate 525 described above. More specifically, it is possible to obtain an extinction ration as high as 200:1 and transmittance as high as 95%. Such high performance can be achieved by optimizing the thickness and number of layers of the multi-layer polarizing optical thin film. Furthermore, since the polarizing transmission angle θp is determined precisely when the element is formed by means of injection molding, there is little variation in the polarizing transmission angle.

In addition, it is possible to greatly improve the coupling efficiency associated with the forward optical path without reducing the detection sensitivity associated with the focusing error signal. Since the polarizing prisms 625 are integrated onto the cover 620, it is possible to realize a small-sized and simple optical head suitable for use in magneto-optical recording and reproducing. Furthermore, the transmittance is improved compared to that of the polarizing plate used in the fifth embodiment. Besides, the variation in the polarizing transmission angle θp is minimized. Thus, an optical head having higher performance can be produced using simplified processes at a lower cost.

In the embodiment shown in FIG. 15, the polarizing prisms 625 are formed by connecting the hologram element 630 and the cover 620. Alternatively, the hologram element 630 may also be made from two separate component elements including a flat plate having slanted planes 634 and an element having a hologram pattern. When the formation of the hologram pattern and slanted planes in the same hologram element 630 produce manufacturing difficulties, the hologram element 630 may be made preferably from two separate component elements.

Figure 16:
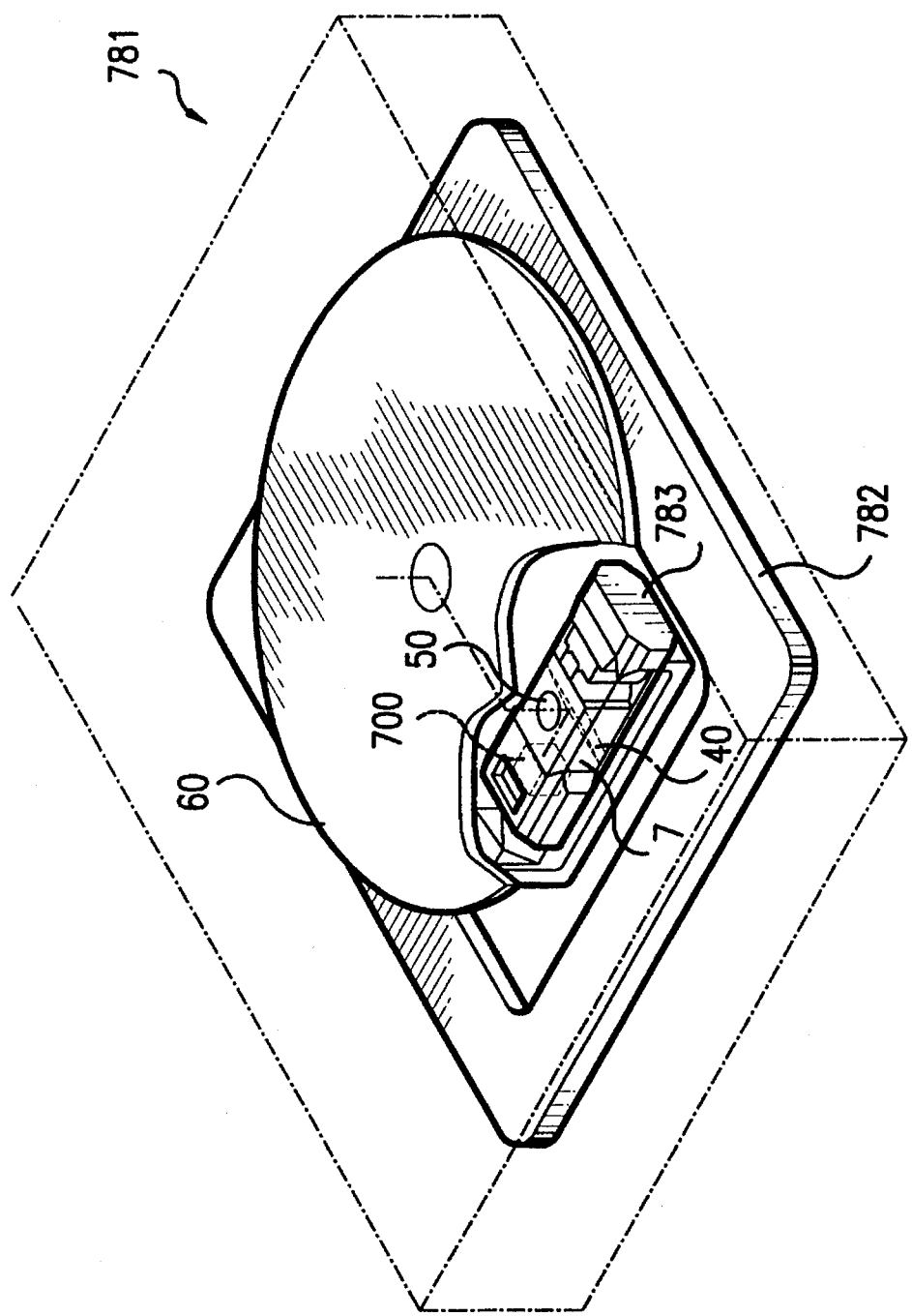
FIG. 16 is a perspective view illustrating an optical recording apparatus according to an embodiment of the present invention.

FIG. 16 illustrates an optical recording apparatus according to another embodiment of the present invention. A chassis 782 is held in the inside of the optical recording apparatus 781. A spindle motor, not shown, is mounted on the chassis 782 so that an optical recording medium 60 can be rotated by the spindle motor. An access mechanism, not shown, is mounted on the chassis 782 for moving the entire actuator 783 in a radial direction of an optical recording medium 60. The actuator 783 controls the position of an optical head 7 having an emitting and receiving optical unit 700, a mirror 40, and an objective lens 50. The actuator 782 controls the position of the optical head 7 based on a focusing error signal and a track error signal fed back from the emitting and receiving optical unit 700.

Since the optical head 7 including the emitting and receiving optical head 700 is very small and light, the actuator 783 can drive the entire optical head 7 as a whole with acceptable acceleration. Since the emitting and receiving optical unit has a cubic shape as small as about 5 mm in length of each edge, and the thickness of the optical head 7 is as small as 8 mm, the internal mechanism of the optical recording apparatus 781 becomes very thin and very simple. More specifically, the total thickness including a control circuit (now shown) can be reduced to about one inch (25.4 mm) which is extremely thin compared to conventional apparatus. Furthermore, the number of optical component elements that are very expensive compared to other elements is reduced, and thus it has become possible to produce an optical recording apparatus at a lower cost.

The invention has been described with reference to embodiments thereof which are intended to be illustrative. Various changes and modifications may be made without departing from the spirit and scope of the invention as defined by the following claims.

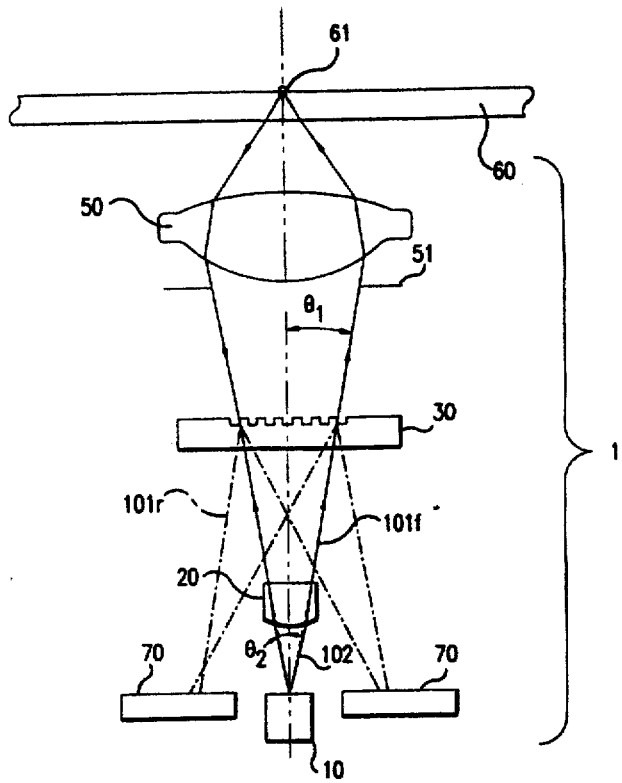

What is claimed is:

1. An optical head having a forward optical path and a rearward optical path through which a light beam travels for use in an optical recording apparatus, comprising:

a light beam emitting assembly that emits a light beam in said forward optical path;

a light beam separating assembly, wherein the light beam travels through said light beam separating assembly in said forward optical path as a non-diffracted light beam;

a light beam focusing element that focuses the non-diffracted light beam in said forward optical path onto an optical recording medium;

a light detection device, wherein a rearward light beam reflected from said optical recording medium follows said rearward optical path through said light beam focusing element and said light beam separating assembly such that the rearward light beam is deflected in said rearward optical path to said light detection device; and a lens element positioned in at least one of said forward optical path and said rearward optical path such that at least one of a magnification and a numerical aperture of the optical head associated with said forward optical path and at least one of a magnification and a numerical aperture of the optical head associated with said rearward optical path are independently set wherein the magnification of said forward optical path is greater than the magnification of said rearward optical path.

2. The optical head according to claim 1, wherein said light beam emitting assembly is a semiconductor laser.

3. The optical head according to claim 1, wherein said light beam separating assembly is a hologram element.

4. The optical head according to claim 1, wherein said light beam separating assembly is a beam splitter.

5. The optical head according to claim 1, wherein the magnification of said optical head associated with said forward optical path is greater than or equal to ¼ and the magnification of said optical head associated with said rearward optical path is less than or equal to ¼.

6. The optical head according to claim 1, wherein an effective numerical aperture of said optical head associated with said forward optical path is greater than or equal to 0.12.

7. The optical head according to claim 1, wherein said lens element has a lens surface, said lens surface is one of a spherical surface, an aspheric surface, a cylindrical surface and an anamorphic surface.

8. The optical head according to claim 1, wherein said lens element is grating lens.

9. The optical head according to claim 1, wherein said lens element is a Fresnel lens.

10. The optical head according to claim 1, wherein at least one of said magnification and said numerical aperture of said optical head associated with said forward optical path and at least one of said magnification and said numerical aperture of said optical head in said rearward optical path are set to increase the coupling efficiency of said optical head and thereby increase the detection sensitivity regarding focusing error.

11. The optical head according to claim 1, further comprising:

a housing containing said light beam emitting assembly and said light detecting device; and a transparent cover for sealing an opening in said housing, wherein said lens element being formed as part of said transparent cover.

12. The optical head according to claim 11, wherein said light beam separating assembly is positioned on said transparent cover.

13. The optical head according to claim 11, wherein transparent cover includes a non-lens region, said lens element produces positive refractory power and is positioned in said forward optical path such that the light beam passes through said lens element and is focused onto said optical recording medium by said focusing element, the rearward light beam reflected from said optical recording medium travels to said light detecting device through said non-lens region of said cover.

14. The optical head according to claim 11, wherein said transparent cover includes a non-lens region, said lens element produces negative refractive power and is positioned in said rearward optical path such that the light beam emitted by said light beam emitting assembly passes through said non-lens region of said cover and is focused onto said optical recording medium by said focusing element, the rearward light beam reflected from said optical recording medium travels to said light detecting device via said focusing element and further via said lens element of said cover.

15. The optical head according to claim 11, further comprising:

a polarizing element, wherein said optical recording medium is a magneto-optical recording medium and the rearward light beam reflected from said magneto-optical recording medium travels through said polarizing element.

16. The optical head according to claim 15, wherein said polarizing element is integral with said cover.

17. An optical head having a forward optical path and a rearward optical path through which a light beam travels for use in an optical recording apparatus, comprising:

light beam emitting means for emitting a light beam through said forward optical path;

light beam separating means for deflecting the light beam in said rearward optical path, the light beam travels through said light beam separating means as non-diffracted light in said forward optical path;

focusing means for focusing the light beam in said forward optical path onto an optical recording medium;

detection means for detecting reflected light beams, wherein a rearward light beam reflected from said optical recording medium follows said rearward optical path passing through said focusing means and said light beam separating means such that said light beam separating means deflects the rearward light beam to said light beam detection means;

a lens means positioned in at least one of said forward optical path and said rearward optical path such that at least one of a magnification and a numerical aperture of the optical head associated with said forward optical path and at least one of a magnification and a numerical aperture of the optical head associated with said rearward optical path are independently set; and light beams refraction means for refracting the light beam such that at least one of a magnification and a numerical aperture of said optical head associated with said forward optical path and at least one of a magnification and a numerical aperture of said optical head associated with said rearward optical path are independently set wherein the magnification of said forward optical path is greater than the magnification of said rearward path.

18. The optical head according to claim 17, further comprising:

housing means for containing said light beam emitting means and said detection means; and cover means for covering an opening in said housing means, wherein said cover means includes said lens means.

19. The optical head according to claim 18, wherein said light beam separating means is positioned on cover means.

20. The optical head according to claim 17, further comprising means for polarizing the light beam.

21. The optical head according to claim 17, wherein the magnification of said optical head associated with said forward optical path is greater than or equal to ¼ and the magnification of said optical head associated with said rearward optical path is less than or equal to ¼.

22. The optical head according to claim 17, wherein an effective numerical aperture of said optical head associated with said forward optical path is greater than or equal to 0.12.

23. The optical head according to claim 17, wherein at least one of said magnification and said numerical aperture of said optical head associated with said forward optical path and at least one of said magnification and said numerical aperture of said optical head in said rearward optical path are set to increase the coupling efficiency of said optical head and thereby increase the detection sensitivity regarding focusing error.

24. A method for recording data on an optical recording medium with an optical recording apparatus containing an optical head having a light beam emitting assembly that emits a beam of light, a light beam separating assembly, a light beam focusing element that focuses said beam of light onto said optical recording medium and a light detection device, wherein a light beam travels from said light beam emitting assembly in a forward optical path to said optical recording medium and from said optical recording medium through a rearward optical path to said light detection device, the method comprising the steps of:

providing a lens element positioned in at least one of said forward optical path and said rearward optical path for independently setting at least one of a magnification and a numerical aperture of said optical head associated with said forward optical path and at least one of a magnification and a numerical aperture of said optical head associated with said rearward optical path wherein the magnification of said forward optical path is greater than the magnification of said rearward optical path;

emitting a beam of light from said light beam emitting assembly; and focusing said beam of light onto said optical recording medium.

25. The method according to claim 24, further comprising the step of determining focusing error by detecting a light beam in said rearward optical path.

26. The method according to claim 25, wherein said step of determining the focusing error includes deflecting the light beam with said light separator assembly towards said light detection assembly.

27. The method according to claim 24, wherein the step of providing a lens element includes independently setting the magnification of said optical head associated with said forward optical path to greater than or equal to ¼ and the magnification of said optical head associated with said rearward optical path to less than or equal to ¼.

28. The method according to claim 24, wherein the step of providing a lens element includes independently setting an effective numerical aperture of said optical head associated with said forward optical system to greater than or equal to 0.12.

29. The method according to claim 24, wherein said optical head includes a housing containing said light beam emitting assembly and said light detecting device and a transparent cover for sealing an opening in said housing, wherein said step of providing a lens element includes forming said lens element as part of said transparent cover.

30. The method according to claim 24, wherein the step of providing a lens element includes positioning said lens element in said forward optical path to produce a positive refractory power whereby the light beam passes through said lens element and is focused onto said optical recording medium by said focusing element.

31. The method according to claim 24, wherein the step of providing a lens element includes positioning said lens element in said rearward optical path to produce a negative refractive power whereby the light beam reflected from said optical recording medium travels to said light detecting device through said lens element.

32. The method according to claim 24, further comprising the steps of setting said at least one of a magnification and the numerical aperture of said optical head associated with said forward optical path and at least one of said magnification and said numerical aperture of said optical head in said rearward optical path to increase the coupling efficiency of said optical head and thereby increase the detection sensitivity regarding focusing error.

33. An optical head having a forward optical path and a rearward optical path through which a light beam travels for use in an optical recording apparatus, comprising:

a semiconductor laser that emits a light beam in said forward optical path;

a hologram element that separates the light beam, wherein the light beam travels through said hologram element in said forward optical path as a non-diffracted light beam;

a focusing element that focuses the non-diffracted light beam in said forward optical path onto an optical recording medium;

a light detection device, wherein a rearward light beam reflected from said optical recording medium follows said rearward optical path through said focusing element and said light beam separating assembly such that the rearward light beam is deflected in said rearward optical path to said light detection device; and a lens element positioned in at least one of said forward optical path and said rearward optical path such that at least one of a magnification and a numerical aperture of said optical head associated with said forward optical path and at least one of a magnification and a numerical aperture of said optical head associated with said rearward optical path are independently set, wherein the magnification of said forward optical path is greater than the magnification of said rearward optical path.

34. The optical head according to claim 33, wherein the magnification of said optical head associated with said forward optical path is greater than or equal to ¼ and the magnification of said optical head associated said rearward optical path is less than or equal to ¼.

35. The optical head according to claim 33, wherein an effective numerical aperture of said optical head associated with said forward optical path is greater than or equal to 0.12.

36. The optical head according to claim 33, wherein said lens element has a lens surface, said lens surface is one of a spherical surface, an aspheric surface, a cylindrical surface and an anamorphic surface.

37. The optical head according to claim 33, wherein said lens element is grating lens.

38. The optical head according to claim 33, wherein said lens element is a Fresnel lens.

39. The optical head according to claim 33, further comprising:

a housing containing said semiconductor laser and said light detecting device; and a transparent cover for sealing an opening in said housing, wherein said lens element being formed as part of said transparent cover.

40. The optical head according to claim 39, wherein said hologram element is positioned on said transparent cover.

41. The optical head according to claim 39, wherein transparent cover includes a non-lens region, said lens element produces positive refractory power and is positioned in said forward optical path such that the light beam passes through said lens element and is focused onto said optical recording medium by said focusing element, the rearward light beam reflected from said optical recording medium travels to said light detecting device through said non-lens region of said cover.

42. The optical head according to claim 39, wherein said transparent cover includes a non-lens region, said lens element produces negative refractive power and is positioned in said rearward optical path such that the light beam emitted by semiconductor laser passes through said non-lens region of said cover and is focused onto said optical recording medium by said focusing element, the rearward light beam reflected from said optical recording medium travels to said light detecting device via said focusing element and further via said lens element of said cover.

43. The optical head according to claim 33, further comprising:
a polarizing element, wherein said optical recording medium is a magneto-optical recording medium and the rearward light beam reflected from said magneto-optical recording medium travels through said polarizing element.

44. The optical head according to claim 33, wherein at least one of said magnification and said numerical aperture of said optical head associated with said forward optical path and at least one of said magnification and said numerical aperture of said optical head in said rearward optical path are set to increase the coupling efficiency of said optical head and thereby increase the detection sensitivity regarding focusing error.

* * * * *

UNITED STATES PATENT AND TRADEMARK OFFICE
CERTIFICATE OF CORRECTION

PATENT NO. : 5,602,383

DATED : February 11, 1997

INVENTOR(S) : Takekoshi, et. al.

It is certified that error appears in the above-identified patent and that said Letters Patent is hereby corrected as shown below:

The Title page should be deleted and substitute therefor the attached Title page.

Drawings:
Delete Drawing Figs. 1, 2, 14, 17, and 18 and substitute therefor the Drawing Figs. consisting of Figs. 1, 2, 14, 17, and 18, as shown on the attached pages.

Signed and Sealed this

Twenty-fourth Day of June, 1997

Attest:

BRUCE LEHMAN

*Attesting Officer*     *Commissioner of Patents and Trademarks*

United States Patent [19]

Takekoshi et al.

[11] Patent Number: 5,602,383
[45] Date of Patent: Feb. 11, 1997

[54] OPTICAL APPARATUS FOR OPTICALLY READING AND RECORDING INFORMATION

[75] Inventors: Taro Takekoshi; Masatoshi Yonekubo, both of Nagano-ken, Japan

[73] Assignee: Seiko Epson Corporation, Tokyo, Japan

[21] Appl. No.: 440,915

[22] Filed: May 15, 1995

[30] Foreign Application Priority Data

May 17, 1994 [JP] Japan .................................... 6-103036

[51] Int. Cl.$^6$ .............................. G02B 7/04; G02B 27/40; G11B 7/00
[52] U.S. Cl. ................................ 250/201.5; 369/44.12; 369/112
[58] Field of Search ........................... 250/201.4, 201.5; 369/44.12, 44.23, 112

[56] References Cited

U.S. PATENT DOCUMENTS

| | | | |
|---|---|---|---|
| 5,313,441 | 5/1994 | Imai et al. | 369/44.12 |
| 5,402,407 | 3/1995 | Eguchi et al. | 369/44.23 |
| 5,422,870 | 6/1995 | Kojima et al. | 369/112 |
| 5,428,584 | 6/1995 | Yoshida et al. | 369/112 |
| 5,446,719 | 8/1995 | Yoshida et al. | 369/44.12 |
| 5,496,995 | 3/1996 | Kato et al. | 369/44.12 |

FOREIGN PATENT DOCUMENTS 63-229640  9/1988  Japan .

*Primary Examiner*—Stephone Allen
*Attorney, Agent, or Firm*—Oliff & Berridge

[57] ABSTRACT

An optical head for use in an optical recording apparatus contains a lens element that permits independent setting of the magnification and numerical aperture for a forward optical system and a rearward optical system. The optical head includes a light beam emitting assembly that emits a beam of light and a light beam separating assembly. A light beam focusing element focuses a forward light beam onto an optical recording medium. The light beam emitted from the light beam emitting assembly follows a forward optical path passing through the light beam separating assembly as a non-diffracted light beam and is focused onto the optical recording medium. A rearward light beam is reflected from the optical recording medium and follows a rearward optical path passing through the focusing element and the light beam separating assembly such that the rearward light beam is deflected to a light detection device. The lens element is positioned in at least one of the forward optical path and the rearward optical path.

44 Claims, 18 Drawing Sheets